(12) United States Patent
Fujita et al.

(10) Patent No.: US 7,604,465 B2
(45) Date of Patent: Oct. 20, 2009

(54) FLUID MACHINE AND SCROLL COMPRESSOR HAVING A CRANKSHAFT WITH A LARGE DIAMETER SHAFT SECTION

(75) Inventors: Katsuhiro Fujita, Kiyosu (JP);
Tomohisa Moro, Kiyosu (JP); Takayuki Kuwahara, Kiyosu (JP); Kazuhide Watanabe, Kiyosu (JP); Tetsuzou Ukai, Kiyosu (JP); Norio Hioki, Kiyosu (JP); Hiroshi Yamazaki, Nagoya (JP); Makoto Takeuchi, Nagoya (JP); Takamitsu Himeno, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/700,874

(22) Filed: Feb. 1, 2007

(65) Prior Publication Data

US 2007/0292293 A1    Dec. 20, 2007

(30) Foreign Application Priority Data

Jun. 14, 2006 (JP) .............................. 2006-164677
Jun. 16, 2006 (JP) .............................. 2006-167903
Jun. 23, 2006 (JP) .............................. 2006-173897

(51) Int. Cl.
*F01C 1/02* (2006.01)
*F03C 2/00* (2006.01)
*F04C 18/00* (2006.01)

(52) U.S. Cl. .................... 418/55.1; 418/55.2; 418/55.4; 418/104; 384/559; 384/560; 384/564; 384/569

(58) Field of Classification Search ........ 418/55.1–55.6, 418/57, 104; 384/559, 560, 564, 569
See application file for complete search history.

(56) References Cited

U.S. PATENT DOCUMENTS

| 5,622,487 | A | 4/1997 | Fukuhara et al. |
| 6,273,616 | B1 * | 8/2001 | Pflug ......................... 418/55.1 |
| 6,439,775 | B1 * | 8/2002 | Ito ............................ 418/55.1 |
| 6,565,340 | B2 * | 5/2003 | Fujita et al. ................ 418/55.1 |

FOREIGN PATENT DOCUMENTS

| CN | 1341810 A |   | 3/2002 |
| DE | 4204631 A1 | * | 10/1992 |
| DE | 19709777 A1 | * | 9/1998 |
| JP | 60-17956 B2 |   | 5/1985 |

(Continued)

*Primary Examiner*—Theresa Trieu
(74) *Attorney, Agent, or Firm*—Birch, Stewart, Kolasch & Birch, LLP

(57) ABSTRACT

There is provided a fluid machine able to secure a sectional area of a passage sufficient for gaseous fluid flow from a suction port to a compression mechanism, while able at the same time to achieve a reduction in size of the outline shape. In a scroll compressor where a scroll compression mechanism is housed within a housing having a funnel shaped, a compression mechanism main body of the scroll compression mechanism is arranged in a wide opening section of a front housing, and a compression mechanism driving section is arranged in a narrow section, a concave section is formed on the outside of a thrust receiving surface which is positioned on a bottom surface of the wide opening section and which supports the compression mechanism.

7 Claims, 9 Drawing Sheets

FOREIGN PATENT DOCUMENTS

| | | |
|---|---|---|
| JP | 2553043 Y2 | 7/1997 |
| JP | 2868998 B2 | 12/1998 |
| JP | 2000-002250 A | 1/2000 |
| JP | 2000-108647 A | 4/2000 |
| JP | 2000-257572 A | 9/2000 |
| JP | 2000-320477 A | 11/2000 |
| JP | 3227075 B2 | 8/2001 |
| JP | 2002-339867 A | 11/2002 |
| JP | 2003-232286 A | 8/2003 |
| JP | 2004-293507 A | 10/2004 |
| JP | 2005-171881 A | 6/2005 |
| JP | 2006214553 A * | 8/2006 |
| KR | 10-2005-0028216 | 3/2005 |

* cited by examiner

FLUID MACHINE AND SCROLL COMPRESSOR HAVING A CRANKSHAFT WITH A LARGE DIAMETER SHAFT SECTION

BACKGROUND OF THE INVENTION

1. Field of the Invention

The present invention relates to a fluid machine such as a scroll compressor, in particular, to a scroll compressor applied to a refrigerant compressor for a refrigeration apparatus or an air conditioning apparatus.

This application is based on Japanese Patent Application Nos. 2006-164677, 2006-167903, and 2006-173897, the content of which is incorporated herein by reference.

2. Description of Related Art

Conventionally, a fluid machine such as a scroll compressor that compresses gaseous fluid is commonly known.

As an example of this kind of fluid machine, there is a fluid machine that is provided with a funnel-shaped lower pressure side housing having a suction port for introducing low pressure gaseous fluid, and a high pressure side housing having a discharge opening for discharging high pressure gaseous fluid, both housings being integrally connected to form a sealed housing in which a compression mechanism such as a scroll compression mechanism is accommodated. In this case, the funnel shaped low pressure housing is constructed so that a main body portion of the compression mechanism is arranged on a large diameter wide opening section side, which is connected to the high pressure housing, and a compression mechanism driving section such as a rotation shaft is arranged in a narrow section of small diameter (for example, refer to the Publication of Japanese Patent No. 3227075 (FIG. 1)).

However, in the conventional fluid machine described above, in order to secure the sectional area of a passage for gaseous fluid to be introduced from a suction port provided in the low pressure side casing into the interior of the compression mechanism to be compressed, the dimension of a gap section δ formed between an inner circumferential surface of the low pressure side casing and an outer circumferential surface of the compression mechanism needs to be set greater. Since the diameter of the housing side is increased to secure the required dimensions for this gap section δ, the outer dimensions of the fluid machine increase by this amount, becoming an obstacle to reducing the size of the fluid machine.

Moreover, for example a body section of the low pressure side casing is generally manufactured by aluminum die casting. However, in this case, a corner section from a sidewall surface to a bottom surface for securing strength may have a curved surface of $R_0$ radius. Therefore, as the gap section δ described above, a gap section of at least $δ_0$ (refer to FIG. 3B) for preventing interference between a body section 5A and an orbiting scroll member 27 needs to be set starting at a position on the flat surface at which the curved surface finishes and a thrust receiving surface 5B begins. That is to say, in order to avoid the orbiting scroll member interfering with and riding up the curved surface of the corner section, the gap section 5 from the inner circumferential surface of the body section 5A to a sliding range of the orbiting scroll member 27 needs to be greater than $δ_0$. This also results in an inevitable increase in the outer dimensions of the fluid machine. Since a small draft angle is provided in the aluminum die casting body section 5A for the sake of production convenience, the outline shape becomes larger as it approaches the upper part of the sidewall surface. As a result, the outline shape of the conventional fluid machine is unnecessarily large.

In consideration of this background, a fluid machine structure that enables a reduction in outer dimensions and shape while securing sufficient sectional area of the passage for introducing gaseous fluid introduced from the suction port into the compression mechanism is desired.

Moreover, the scroll compressor is such that a stationary scroll and an orbiting scroll are arranged so as to intermesh with each other inside the housing. A plurality of compression chambers are formed between the stationary scroll and the orbiting scroll. The scroll compressor is constructed such that the orbiting scroll is orbitally driven and the compression chamber is shifted from its outer circumferential position to the center position while its capacity reduces to compress a fluid.

In order to orbitally drive the orbiting scroll with respect to the stationary scroll, a crankshaft is provided in the housing allowing it to freely rotate around its axis. A large diameter shaft section is provided on one end section of this crankshaft. Furthermore, an eccentric pin that is connected to the orbiting scroll via a drive bush and that orbitally drives the orbiting scroll at a predetermined rotation radius, is provided in the large diameter shaft section. The large diameter section of the crankshaft is supported by the housing. The large diameter shaft section is supported in the housing via a main bearing constructed for example from a ball bearing disclosed in the Publication of Japanese No. 2868998. Thus, the crankshaft is supported, allowing it to freely rotate around its axis.

A seal member that seals off (separates) the interior of the housing from the outside, is provided on the other end side of the crankshaft.

For example, in a scroll compressor used in a refrigeration cycle, the refrigerant sucked in is introduced between an inner ring and an outer ring of the bearing, and lubrication oil contained in the refrigerant lubricates the bearing.

In the case of the ball bearing, the components thereof are in point-contact with each other (inner ring and ball, ball and outer ring). Therefore, the ball bearing becomes a comparatively large structure corresponding to the load to be supported, and a gap for carrying out sufficient refrigerant introduction into the interior can be secured. On the other hand, if a ball bearing is used for the main bearing, there will be a problem of an increase in the size of the housing.

In this kind of scroll compressor, a greatest reduction in size and weight possible is required for the sake of installation. Therefore, a main bearing that uses a needle shaped roller bearing having an outer ring to reduce the size of the housing, as disclosed for example in Japanese Unexamined Patent Application, Publication No. 2000-2250, has been proposed.

However, the gap within the interior of the needle shaped roller bearing having an outer ring is small compared to a ball bearing. As a result, if the needle shaped roller bearing having an outer ring is used as a main bearing, insufficient refrigerant is introduced into the bearing, raising the possibility of insufficient lubrication for the bearing.

For this reason, in a needle shaped roller bearing having an outer ring, disclosed in Japanese Unexamined Patent Application Publication No. 2000-2250 the shape of an end section in the axial direction of the outer ring is devised so as to secure a gap for introducing refrigerant.

However, since the roller bearing disclosed in Japanese Unexamined Patent Application, Publication No. 2000-2250 needs to use a needle shaped roller bearing having an outer ring in a special shape, there is a problem of an increase in production cost.

Furthermore, a scroll compressor is disclosed in Japanese Unexamined Patent Applications, Publication Nos. 2000-108647 and 2000-320477 in which a scroll compressor houses a scroll compression mechanism constructed from a pair of a stationary scroll member and an orbiting scroll member within a housing constructed from a funnel shaped front housing and a rear housing connected to a large diameter opening section of the front housing, the stationary scroll member being fixed and installed in the rear housing, a seal member being placed between an end plate of the stationary scroll member and the housing, the interior of the housing being separated into a high pressure discharge chamber side and a low pressure intake chamber side.

Here, the stationary scroll member is constructed from an end plate and a spiral wrap standing upright on one side of this end plate so that its axis is substantially orthogonal thereto. In the same way, the orbiting scroll member is constructed from an end plate and a spiral wrap standing upright on one side of this end plate so that its axis is substantially orthogonal thereto.

Moreover, a scroll compressor proposed in Japanese Examined Patent Application, Publication No. Sho 60-17956, that houses a scroll compression mechanism constructed from a pair of a stationary scroll member and an orbiting scroll member within a housing constructed from a cup shaped rear housing and a front housing connected to a large diameter opening section of this rear housing, employs the following construction. Specifically, in Japanese Examined Patent Application, Publication No. Sho 60-17956, there is proposed a scroll compression mechanism capable of performing three dimensional compression that enables compression in the circumferential direction and in the wrap height direction, in which step sections are respectively provided on a tip end surface (the end surface facing the side opposite to the end plate) and a bottom surface (area exposed to the space within the spiral wrap on the end plate) of the respective spiral wraps of the stationary scroll member and the orbiting scroll member, and the wrap height on the outer circumference side of the spiral wrap (length from the bottom surface to the tip end surface of the spiral wrap) is higher than the wrap height on the inner circumference side. Furthermore, in Japanese Examined Patent Application, Publication No. Sho 60-17956, there is proposed a construction in which the stationary scroll member of the scroll compression mechanism is fixed and installed on the rear housing side with a seal member placed between the end plate of the stationary scroll member and the housing, and the interior of the housing is separated to form a high pressure discharge chamber side and a low pressure intake chamber side.

However, in the scroll compressor disclosed in Japanese Unexamined Patent Applications, Publication Nos. 2000-108647 and 2000-320477 mentioned above, a seal member that seals off the interior of the housing from the atmospheric air is arranged between the high pressure discharge chamber and the atmospheric air. As a result, there is a problem in that high pressure gas may leak directly into the atmospheric air in the case where a failure occurs in the seal member or leakage occurs due to an unusual rise in high pressure.

Moreover, the above seal member is arranged in a diameter position substantially equal to that of the inner diameter of the housing or the outer diameter of the end plate of the stationary scroll member. According to such construction, a high pressure load is applied on the entirety of the surfaces of the housing and the stationary scroll member end plate, and the area that receives pressure load due to this high pressure is maximized. As a result, there is a possibility of gas leakage due to minute deformation in the housing and the end plate caused by excessive pressure load. Therefore, it is necessary to increase the rigidity of the housing and the end plate by increasing their plate thickness, resulting in an increase in weight of the compressor that obstructs a reduction in the weight of the compressor.

In addition, a scroll compressor disclosed in Japanese Examined Patent Application, Publication, No. Sho 60-17956 has a construction that does not allow direction leakage of high pressure gas from the discharge chamber into the atmospheric air, due to an arrangement and construction of the housing and seal member mentioned above. However, since the above seal member is arranged on the outer circumference of the end plate of the stationary scroll member, there is no difference whatsoever between the construction of Japanese Unexamined Patent Application, Publication No. 2000-108647 and Japanese Unexamined Patent Application, Publication No. 2000-320477 with respect to the area of portions of the housing and the stationary scroll member end plate that receive pressure load due to high pressure.

Therefore, problems related to gas leakage due to minute pressure deformation, and an increase in the weight of the compressor as a result of increasing the rigidity of the housing and the end plate as a counter measure for the leakage, are yet to be resolved in reality.

In particular, achieving a reduction in weight of a compressor to be applied to an air conditioning apparatus for a vehicle has been one of the most significant problems.

BRIEF SUMMARY OF THE INVENTION

In consideration of the circumstances described above, an object of the present invention is to provide a fluid machine able to secure a sectional area of a passage sufficient for gaseous fluid flow from a suction port to the compression mechanism, while able at the same time to achieve a reduction in size of the outline shape.

Moreover, in consideration of the problems described above, the present invention also aims to provide a scroll compressor that can be manufactured inexpensively using a generic needle shaped roller bearing having an outer ring, and that can achieve a reduction in the size and weight of the housing.

Moreover, the present invention is achieved in consideration of such circumstances, and aims to provide a reduced weight scroll compressor in which the housing construction and arrangement of a seal member that seals off between the atmospheric air and the housing, and between the low pressure side and the high pressure side within the housing are optimized to resolve gas leakage due to pressure deformation in the housing and scroll members without resorting to increasing their rigidity.

The present invention employs the following means to solve the problems described above.

A fluid machine according to a first aspect of the present invention is a fluid machine in which a compression mechanism is housed and installed within a funnel shaped housing, a compression mechanism main body of the compression mechanism being arranged in a wide opening section of the housing, and a compression mechanism driving section being arranged in a narrow section, wherein a concave section is formed on the outside of a compression mechanism support surface, positioned on a bottom surface of the wide opening section to support the compression mechanism.

According to such a fluid machine, since the concave section is formed on the outside of the compression mechanism support surface that is positioned on the bottom surface of the wide opening section to support the compression mechanism, this concave section functions as a passage for gaseous fluid. Therefore, since the sectional area of the passage for gaseous fluid increases, a diameter of the housing can be reduced by reducing the dimension of a gap section δ.

In the first aspect of the present invention mentioned above, it is preferable that the concave section and an interior space of the narrow section be communicated with each other. As a result, gas can be introduced into the compression mechanism driving section to improve the cooling and lubrication thereof.

In the first aspect of the present invention, it is preferable that the concave section has an arc shape. As a result, the strength in a corner section of a pressure container can be secured easily, while the gap section δ can be set with hardly any influence from the curved surface of the corner section.

In this case, it is preferable that the concave section is formed by means of surface casting, thereby reducing the number of processes.

In the above first aspect of the present invention, the compression mechanism is a scroll compression mechanism, and if the compression mechanism support surface is a thrust receiving surface, burrs are unlikely to be produced when machine processing the thrust receiving surface.

A fluid machine according to a second aspect of the present invention is a fluid machine in which a compression mechanism is housed and installed within a funnel shaped low pressure side housing provided with a suction port, a compression mechanism main body of the compression mechanism being arranged in a wide opening section of the low pressure side housing, and a compression mechanism driving section being arranged in a narrow section, wherein a concave section is formed on the outside of thrust receiving surface that is positioned on a bottom surface of the wide opening section to support the compression mechanism.

According to such a fluid machine, since the concave section is formed on the outside of the thrust receiving surface that is positioned on the bottom surface of the wide opening section to support the compression mechanism, this concave section functions as a passage for gaseous fluid. Therefore, since the sectional area of the passage for gaseous fluid increases, a diameter of the housing can be reduced by reducing the dimension of a gap section δ.

According to the first and the second aspects of the present invention mentioned above, since the sectional area of the passage for gaseous fluid is secured by forming the concave section on the outside of the thrust receiving section that supports the compression mechanism, the diameter of the housing can be reducing by reducing dimensions of the gap section. Therefore, a fluid machine that sufficiently secures the sectional area of the passage for introducing gaseous fluid introduced from the suction port into the compression mechanism while achieving a reduction in outline size by reducing the dimension of the gap section can be provided.

Moreover, in order to solve the above problems, the present invention employs the following means.

That is to say, a scroll compressor according to a third aspect of the present invention is a scroll compressor having: a housing, and a compression mechanism, the compression mechanism having a stationary scroll fixed and supported in the housing, and an orbiting scroll that is intermeshed with the stationary scroll to form a plurality of compression chambers between the stationary scroll and the orbiting scroll and that revolves; and further comprises; a crankshaft provided with a large diameter shaft section having an eccentric member for orbiting the orbiting scroll member, provided on one end section, the large diameter shaft section being freely rotatably supported on the housing via needle shaped roller bearings having an outer ring; a seal member arranged on an other end side of the crankshaft that seals off the interior of the housing from outside; and a crank chamber into which fluid containing lubrication oil is sucked, provided between the orbiting scroll member and the large diameter shaft section; wherein a position of the end section on the one end side on a circumferential surface of the large diameter shaft section is positioned to the other end side of the position of the end section on the one end side of the outer ring of the needle shaped roller bearing having an outer ring.

In this way, since the end section position on the one end side on the outer circumferential surface of the large diameter shaft section is positioned on the other end side of the position of the end section on the one end side of the outer ring, a gap is formed between the one end side on the outer circumferential surface of the large diameter shaft section and the end section on the one end side of the outer ring.

Since the fluid containing the lubrication oil introduced into the crank chamber travels through this gap and is introduced into the needle shaped roller bearing having an outer ring, the needle shaped roller bearing having an outer ring can be cooled by the fluid while being lubricated by the lubrication oil.

In this way, since the gap for introducing fluid is secured by determining the end section position on the one end side on the outer circumferential surface of the large diameter shaft section, a generic needle shaped roller bearing having an outer ring can be employed, and production cost of the scroll compressor can be reduced.

Furthermore, since the needle shaped roller bearing having an outer ring is used, the housing can be made smaller and lighter.

Moreover, in a third aspect of the above present invention, it is preferable that the end section position on the other end side on the outer circumferential surface of the large diameter shaft section be positioned to the one end side of the position of the end section on the other end side of the outer ring.

As a result, since the fluid containing lubrication oil travels through the gap formed between the other end side on the circumferential surface of the large diameter shaft and the end section on the other end side of the outer ring to be supplied to the seal member, cooling and lubrication of the seal member can be carried out even more reliably.

Moreover, a scroll compressor according to a fourth aspect of the present invention is a scroll compressor having: a housing, and a compression mechanism, the compression mechanism having a stationary scroll fixed and supported in the housing, and an orbiting scroll that is intermeshed with the stationary scroll to form a plurality of compression chambers between the stationary scroll and the orbiting scroll, and that revolves; and further comprising: a crankshaft with a large diameter shaft section having an eccentric member for orbiting the orbiting scroll on one end section, the large diameter shaft section being freely rotatably supported on the housing via needle shaped roller bearings having an outer ring; a seal member arranged on an other end side of the crankshaft for sealing off the interior of the housing from outside; and a crank chamber into which fluid containing lubrication oil is sucked, provided between the orbiting scroll member and the large diameter shaft section; wherein the axial direction dimension of a circumferential surface of the large diameter shaft section is made shorter than the axial direction dimension of the outer ring of the needle shaped roller bearing having an outer ring.

In this way, since the axial direction dimension of the outer circumferential surface of the large diameter shaft section is shorter than the axial direction dimension of the outer ring, a gap is formed between at least the one end side of the outer circumferential surface of the large diameter shaft section and the end section on the one end side of the outer ring.

Since the fluid containing the lubrication oil introduced into the crank chamber travels through this gap and is introduced into the needle shaped roller bearing having an outer ring, the needle shaped roller bearing having an outer ring can be cooled by the fluid while being lubricated by the lubrication oil.

In this way, since the gap for introducing fluid is secured by making the axial direction dimension of the outer circumferential surface of the large diameter shaft section shorter than the axial direction dimension of the outer ring, a generic needle shaped roller bearing having an outer ring can be employed and production costs of the scroll compressor can be reduced.

Furthermore, since the needle shaped roller bearing having an outer ring is used, the housing can be made smaller and lighter.

In addition, since the gap can be formed between the other end side of the outer circumferential surface of the large diameter shaft section and the end section on the other end side of the outer ring, depending on the axial direction dimension of the outer circumferential surface of the large diameter shaft section, the seal member can be cooled and lubricated more reliably by the fluid containing lubrication oil that has traveled through the gap.

Moreover, in the third and the fourth aspects of the present invention described above, it is preferable that a cutaway section, cut out from the outer circumferential surface towards the one end section, be provided in the one end section of the large diameter shaft section.

As a result, the axial direction length of the large diameter shaft section can be secured while securing the gap between the outer ring and the large diameter shaft section.

According to the third and the fourth aspects of the present invention described above, the gap able to introduce fluid between the one end side of the outer circumferential surface of the large diameter shaft section and the end section of the one end side of the outer ring, is secured by prescribing the one end section position or the axial direction length of the large diameter shaft section, and the housing is provided with a boss section in which communication holes that can be communicated with predetermined space sections in the interior can be processed in a plurality of places. As a result, a generic needle shaped roller bearing having an outer ring is good enough to be employed, and hence the scroll compressor can be inexpensively produced.

Moreover, in the third and the fourth aspects of the present invention, since the needle shaped roller bearing having an outer ring is used, the housing can be made smaller and lighter.

Furthermore, in order to solve the above problems, the scroll compressor of the present invention employs the following means.

Specifically, a scroll compressor according to a fifth aspect of the present invention is a scroll compressor comprising: a housing; a scroll compression mechanism constructed from a pair of a stationary scroll member and an orbiting scroll member housed and installed within the housing; and a driving shaft that orbitally drives the orbiting scroll member of the scroll compression mechanism housed and installed within the housing; wherein the housing is constructed from a front housing and a rear housing that covers a body section opening of the front housing that house the scroll compression mechanism, the front housing having a funnel shape and being provided with the large diameter body section in which the scroll compression mechanism is installed, and a driving shaft support section connected to the body section and having a smaller diameter than that of the body section, in which the driving shaft is installed; the stationary scroll member has an end plate and a spiral wrap standing upright on one side of this end plate so that its axis is substantially orthogonal thereto; a first seal member is placed in a position between the end plate and the inner surface of the rear housing, on the inner circumference side of the outer circumference of the end plate; the stationary scroll member is fastened and fixed on the inner surface of the rear housing via first bolts so as to separate off a discharge chamber that discharges gas compressed in the scroll compression mechanism, in an area on the inner circumference side of the first seal member, together with the rear housing and the first seal member; and the first seal member divides the interior space of the housing into the discharge chamber and an intake chamber formed within the space apart from the discharge chamber.

According to a fifth aspect of the present invention, the scroll compressor is constructed so that the stationary scroll member is fastened and fixed on the inner surface of the rear housing by first bolts with the first seal member placed between an end surface on the inner circumference side of the outer circumference of the end plate of the stationary scroll member and the inner surface of the rear housing, thereby separating the discharge chamber on the inner circumference side of the first seal member. As a result, the area of the portion of the end plate of the rear housing and the stationary scroll member that receive a pressure load due to high pressure can be made narrow. Accordingly, the end plate of the stationary scroll member, the rear housing, and the first bolts can be small.

In other words, since the pressure load is reduced when the pressure receiving area becomes smaller, the stress on the members that receive pressure is reduced. Accordingly, sufficient rigidity and strength can be secured even in a structure having members that are made thinner and lighter, by the amount by which the stress is thus reduced.

Moreover, the intake chamber is formed on the outer circumference side of the first seal member that separates the discharge chamber. As a result, even if gas leaks from the discharge chamber, direct leakage of the gas into atmospheric air can be prevented, and damage to the compressor due to an unusual pressure rise can be prevented beforehand by leaking the gas from the discharge chamber into the intake chamber when unusually high pressure arises.

Furthermore, in a scroll compressor according to a fifth aspect of the present invention, it is preferable to have a construction in which the rear housing is fastened and fixed on the opening section of the front housing by a second bolt via a second seal member that seals from the atmospheric air, and the second seal member seals off the intake chamber from the atmospheric air on the outer circumference side of the first seal member.

In other words, it is preferable to have a construction where the rear housing is fastened and fixed to the opening section of the front housing by the second bolt via the second seal member, which seals the connection section between the rear housing and the front housing and which isolates the interior of the housing from the atmosphere outside the housing, and the second seal member isolates the intake chamber from the atmosphere outside the housing on the outer circumference side of the first seal member.

Since the second seal member seals off the intake chamber, that is, a low pressure zone within the housing, from the atmospheric air (atmosphere outside the housing), a pressure difference between the sealed spaces can be made small.

Therefore, a seal structure between these spaces can be simplified, and the second bolt and fastening flanges that fasten and fix the rear housing on the front housing can be small.

Furthermore, in the scroll compressor according to the fifth aspect of the present invention, it is preferable that a spigot section that is fitted within the opening section of the front housing be formed in the rear housing, and that the rear housing be fastened and fixed onto the front housing by the second bolt in a state where the spigot section is fitted within the opening section.

In this case, since the spigot section is fitted inside the opening of the front housing, the front housing can suppress minute pressure deformation in the opening direction of the rear housing. Therefore, gas leakage due to minute pressure deformation of the rear housing, the stationary scroll member, and so forth can also be suppressed.

Furthermore, it is preferable that the second seal member be placed between the spigot section and the front housing.

In this case, since the second seal member is placed between the spigot section and the front housing, even if minute pressure deformation in the opening direction in the rear housing occurs, the second seal member will be shifted only in the axial direction by this. Therefore, sealing functionality can be reliably secured.

Furthermore, the second seal member may be installed on the spigot section side.

As described above, in the case where the second seal member is installed on the spigot section side of the rear housing, the second seal member can be easily held during assembly simply by fitting it in the spigot section.

Furthermore, in the case where the second seal member is installed in the spigot section of the rear housing in this way, a minute gap may be formed between a mouth side (tip end side) of an installation section of the second seal member in the spigot section and the opening of the front housing.

In other words, the outer diameter of the spigot section in the zone on the mouth side of the installation section of the second seal member in the spigot section is smaller than the inner diameter of the opening of the front housing, and the minute gap may thereby be formed.

In this way, since the minute gap is formed on the mouth side of the second seal member installation section in the spigot section, the difference between the outer diameter of the spigot section and the inner diameter of the second seal member becomes small, enabling easier installation of the second seal member to the spigot section. Moreover, on the mouth side of the second seal member installation section in the spigot section, a clearance for allowing relative movement of the spigot section and the front housing is secured between the spigot section and the opening of the front housing during assembly of the scroll compressor, and fitting the spigot section to the opening section of the front housing can be carried out more easily.

Furthermore, the scroll compressor according to the fifth aspect of the present invention may be such that: a spigot section is formed in a position on the inner side of the outer circumference side of the end surface on the end surface that faces the rear housing side of the end plate of the stationary scroll member; a section for fitting the spigot section is formed in the inner surface of the rear housing; the spigot section is fitted in the fitting section; the first seal member is placed on the outer circumference side of this fitting position; and the stationary scroll member is fastened and fixed on the inner surface of the rear housing by the first bolts via a screw boss section formed on the end surface that faces the rear housing side of the end plate. Hereinafter, a first construction of the fifth aspect of the present invention refers to this construction.

In this way, by fitting the spigot section of the stationary scroll member to the fitting section of the rear housing and placing the first seal member on the outer circumference side of the fitting position to install the stationary scroll member, the stationary scroll member can be accurately positioned with respect to the rear housing in assembly regardless of the placing of the first seal member and can be fastened and fixed by the first bolts.

Furthermore, the first seal member may be placed in a corner section between the spigot section and the fitting section. Here the corner section, in the spigot section refers to an intersection section of an outer circumferential surface and a wall surface that stands up towards the outer circumference side from this outer circumferential surface, while the corner section in the fitting section refers to an intersection section of an inner circumferential surface and a wall surface that stands up towards the outer circumference side from this inner circumferential surface.

As described above, since the first seal member is held in the corner section by placing the first seal member in the corner section between the spigot section and the fitting section, processing a seal groove for installation of the first seal member is not required, and a cost reduction in processing can be achieved as a result.

Furthermore, in the scroll compressor according to the first construction of the fifth aspect of the present invention, a thickness of the outermost circumferential portion of the end plate on the outer circumference side of the spigot section of the end plate of the stationary scroll member may be formed thinner than that of other portions.

In this way, since the first seal member is placed in the fitting position of the spigot section, a high pressure load is not applied to the region on the outer circumference side of the spigot section of the end plate. Therefore, the thickness of the end plate outermost circumferential portion on the outer circumference side of the spigot section can be made thinner than that of other portions. Therefore, the weight of the stationary scroll member can be reduced by an amount corresponding to the volume of the reduced plate thickness, and the weight of the scroll compressor can be reduced in turn.

Furthermore, in the scroll compressor according to the fifth aspect of the present invention, the construction of the scroll compression mechanism may be such that the pair of the stationary scroll member and the orbiting scroll member are constructed so that the spiral wraps are provided standing upright on the end plates, and respective step sections are provided on the tip end surfaces of the respective spiral wraps and on bottom surfaces of the end plates, the spiral wrap height on the outer circumference side of the spiral wrap being higher than the spiral wrap height on the inner circumference side, so that three dimensional compression capable of compressing in the circumferential direction and in the wrap height direction can be performed. Hereinafter, a second construction of the fifth aspect of the present invention refers to this construction.

As described above, by increasing the spiral wrap height of the stationary scroll member and the orbiting scroll member on the outer circumference side, the compressor capacity can be increased without increasing the scroll diameter. As a result, a reduction in size and weight of the scroll compressor can be achieved.

Furthermore, in the scroll compressor according to the second construction of the fifth aspect of the present invention, the screw boss section on which the first bolts are fastened and fixed is formed on the end surface in a position on the inner circumference side of the step section on the bottom surface of the end plate of the stationary scroll member.

In this way, since the screw boss section is formed in a region where the plate thickness increases due to the formation of the step section on the bottom surface of the spiral wrap, the thickness of the end plate can be utilized to provide a screw hole for the first bolt that requires an engagement depth at least 1.5 times the screw diameter. Accordingly, the axial direction dimension of the scroll compressor, the minimum dimension being restricted to the length of the first bolt, can be reduced, and the size and weight of the scroll compressor can be reduced while improving the mountability of the scroll compressor.

Furthermore, a screw hole for the first bolt may be provided in the screw boss section so as to extend from the bottom surface on the outer circumference side of the step section towards the axial direction wrap side.

In this way, the axial direction dimension of the scroll compressor, the minimum dimension being restricted to the length of the first bolt, can be reduced to the greatest possible extent by providing the screw hole that requires an engagement depth of a predetermined length from the bottom surface of the spiral wrap on the outer circumference side of the step section towards the axial direction wrap side.

Furthermore, the screw boss section may be provided on the inner circumference side of the first seal member.

In this way, since the screw boss section is provided on the inner circumference side of the first seal member, and the stationary scroll member is fastened and fixed in the screw boss section by the first bolt, a force that acts on the first seal member placed on the outer circumference side of the screw boss section can be reduced. As a result, the lifetime of the first seal member can be extended.

Furthermore, a clamping groove to be used during processing of the stationary scroll member may be provided on the outer circumference of the screw boss section.

In this way, since the clamping groove to be used in processing the stationary scroll member is provided on the outer circumference of the screw boss section, the stationary scroll member can be stably clamped during processing using this groove even when the plate thickness of the end plate outermost circumference portion of the stationary scroll member is made thin. Therefore, the stationary scroll member can be processed to a high level of accuracy.

Furthermore, the groove may be provided around the entire outer circumference of the screw boss section.

In this way, since the groove is provided around the entire outer circumference of the screw boss section, the weight of the stationary scroll member can be reduced by an amount corresponding to the volume of this groove.

According to the fifth aspect of the present invention, since the first seal member is placed between the end surface on the inner circumference side of the outer circumference of the end plate of the stationary scroll member and the rear housing to separate the discharge chamber on the inner circumference side of the first seal member, the area of the stationary scroll member end plate and the rear housing that bear a pressure load due to high pressure can be reduced. Therefore, the stationary scroll member end plate, the rear housing, and the first bolt that fastens and fixes them can all be small, and the weight of the stationary scroll member, the housing, and so forth can be reduced, thereby reducing the weight of the compressor.

Moreover, since the intake chamber is formed on the outer circumference side of the first seal member, even if gas leakage from the discharge chamber occurs, direct leakage into the atmospheric air can be prevented. At the same time, in the case of an unusual pressure rise, damage to the compressor due to an unusual rise in pressure can be prevented before it occurs, by leaking compressed gas from the discharge chamber into the intake chamber.

Moreover, the second seal member is placed between the rear housing and the opening section of the body section of the front housing to seal between the intake chamber and the atmospheric air between which the pressure difference is small. As a result, a seal structure realized by the second seal member can be simplified, and the second bolt and fastening flange that fasten and fix the rear housing on the front housing can be small. Therefore, this also contributes to a reduction in the weight of the housing so that the weight of the compressor can be reduced.

DETAILED DESCRIPTION OF THE INVENTION

First Embodiment

Hereinafter, a first embodiment of a fluid machine according to the present invention is described, with reference to the drawings.

Figure 1:
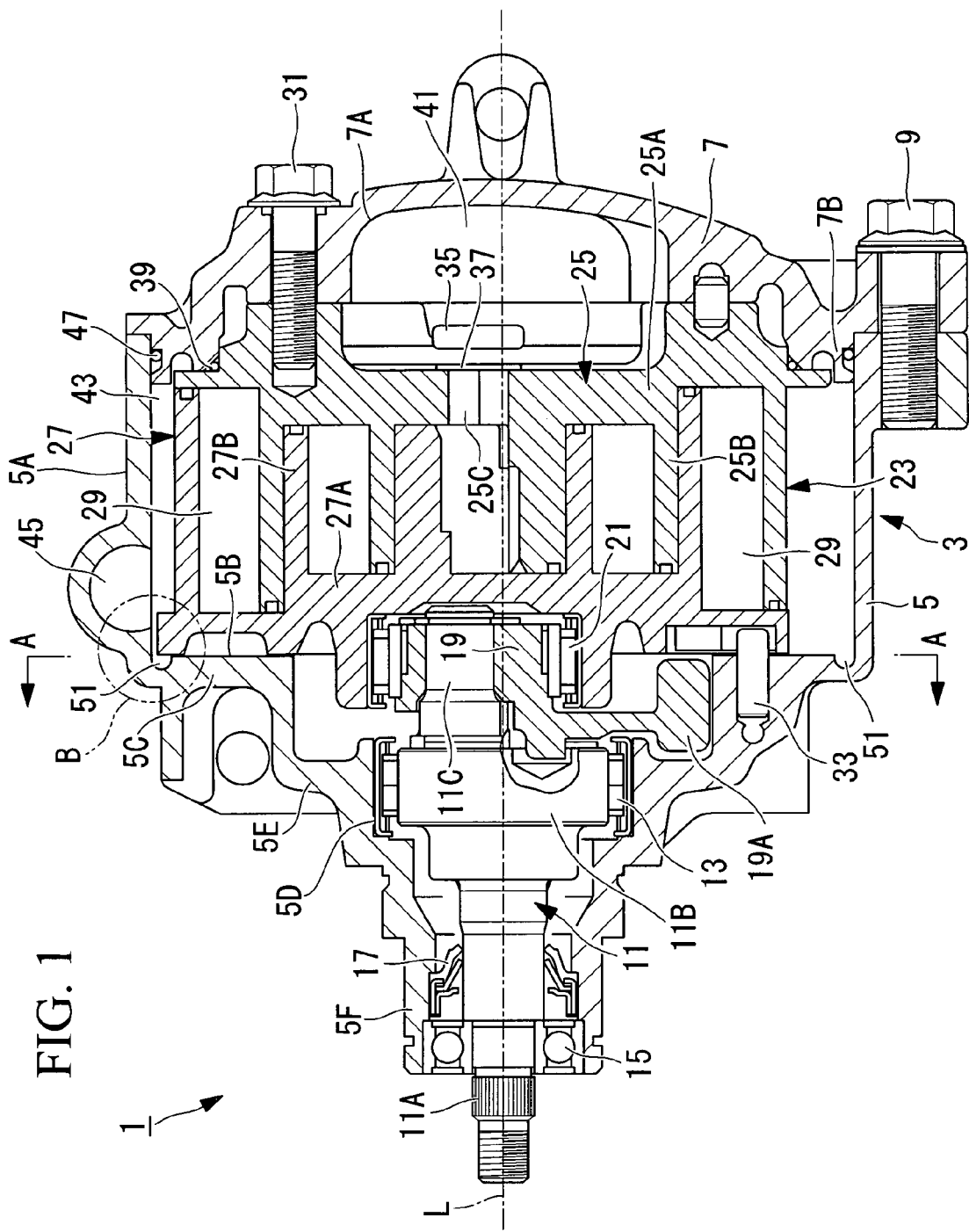
FIG. 1 is a sectional view showing a construction of a scroll compressor as a first embodiment of a fluid machine according to the present invention.

FIG. 1 is a sectional view showing a scroll compressor 1 used for compression of refrigerant gas or the like, as the first embodiment of the fluid machine according to the present invention.

The scroll compressor 1 shown in the diagram is a horizontal type applied to a refrigeration apparatus or air conditioning apparatus, in particular, to a refrigeration apparatus or air conditioning apparatus for a vehicle, and has a housing 3 that forms an approximate outline of the scroll compressor 1 and that houses a compression mechanism in its inside space. This housing 3 is provided with a low pressure side front housing 5 and a high pressure side rear housing 7, respective flange sections of which being integrally tightly fastened to each other and fixed by bolts 9 only one shown. Moreover, the compression mechanism of the scroll compressor 1 serves as a scroll compression mechanism 23, described later, and is constructed from a compression mechanism main body and a compression mechanism driving section.

A crankshaft 11 that constitutes the compression mechanism driving section is supported within the front housing 5 through a main bearing 13 and a sub bearing 15, which allow it to rotate freely around an axis L. One end side (left side in the diagram) of the crankshaft 11 is a small diameter shaft section 11A. This small diameter shaft section 11A passes completely through the front housing 5 and projects towards the left side of FIG. 1. As is commonly known, an electromagnetic clutch, a pulley and so forth (not shown in the diagram) that receive motive power, are provided on the projection section of the small diameter shaft section 11A, and power is transmitted thereto from a driving force source (not shown in the diagram) such as an engine, via a V belt.

Furthermore, a mechanical seal (lip seal) 17 is installed between the main bearing 13 and the sub bearing 15 to air tightly seal between inside the housing 3 and the atmospheric air. That is to say, inside the housing 3 is isolated from the atmospheric air by the mechanical seal provided between the main bearing 13 and the sub bearing 15.

A large diameter shaft section 11B is provided on the other end side (right side in the diagram) of the crankshaft 11, and an eccentric pin 11C, which is eccentric to the axis L of the crankshaft 11 by a predetermined distance, is provided integrally on this large diameter shaft section 11B. This large diameter shaft section 11B and the small diameter shaft section 11A are respectively supported within the front housing 5 to allow free rotation through the main bearing 13 and the sub bearing 15. A drive bush 19 that constitutes a compression mechanism driving section together with the crankshaft 11, and an orbiting scroll member 27 that constitutes a compressor main body described later, are linked to the eccentric pin 11C via a drive bearing 21 so that the orbiting scroll member 27 is orbitally driven by rotation of the crankshaft 11.

A balance weight 19A for canceling an unbalanced load that occurs as a result of the orbital driving of the orbiting scroll member 27, is formed integrally with the drive bush 19 so as to rotate together with the orbital driving of the orbiting scroll member 27.

Moreover, a pair made of a stationary scroll member 25 and the orbiting scroll member 27 is fitted into the interior of the housing 3 as the compression mechanism main body that constitutes the scroll compression mechanism 23. The stationary scroll member 25 is constructed from an end plate 25A and a spiral wrap 25B standing upright on the end plate 25A, and the orbiting scroll member 27 is constructed from an end plate 27A and a spiral wrap 27B standing upright on the end plate 27A.

The pair of the stationary scroll member 25 and the orbiting scroll member 27 are fitted together in a state where each of their centers is distanced from the other by the turning radius amount, and where the spiral wraps 25B and 27B are fitted with each other with a 180 degree phase shift. As a result, a pair of compression chambers 29 limited by the end plates 25A and 27A and the spiral wraps 25B and 27B, are formed between both of the scroll members 25 and 27 in symmetry with respect to the center of scroll. The stationary scroll member 25 is fixed on an inner surface of the rear housing 7 by a bolts 31, and the eccentric pin 11C provided on one end side of the above crankshaft 11 is linked to a boss section provided on a back surface of the end plate 27A so that the orbiting scroll member 27 is orbitally driven.

The back surface of the end plate 27A of the orbiting scroll member 27 is supported on a thrust receiving surface 5B formed in the front housing 5. The orbiting scroll member 27 is prevented from rotating by a rotation prevention mechanism 33, such as a pin ring or an Oldham ring, that intervenes between this thrust receiving surface 5B and the back surface of the orbiting scroll member 27, to be orbitally driven around the stationary scroll member 25.

An opening of a discharge port 25C for discharging compressed refrigerant gas is provided in a center section of the end plate 25A of the stationary scroll member 25, and a discharge reed valve 37 attached to the end plate 25A via a retainer 35 is provided in the discharge port 25C. Furthermore, a seal member 39 such as an O-ring is placed on the back surface side of the end plate 25A of the stationary member 25 to make tight contact with the inner surface of the rear housing 7, and a discharge chamber 41 separated from an inner space of the housing 3, is formed between the back surface side of the end plate 25A and the rear housing 7. Accordingly, the inner space of the housing 3 apart from the discharge chamber 41 is constructed to function as a low pressure side intake chamber 43. The refrigeration gas returning from the refrigeration cycle via a suction port 45 provided in the front housing 5 is sucked into the intake chamber 43, and is sucked via the intake chamber 43 into a compression chamber 29 formed between the stationary scroll member 25 and the orbiting scroll member 27.

A seal member 47 such as an O-ring is placed on a joint surface between the front housing 5 and the rear housing 7 to air tightly seal the intake chamber 43 formed within the housing 3 from the atmospheric air.

The scroll compression mechanism 23 is housed within the front housing 5. This front housing 5 has a funnel shape, the diameter of which reduces in phases, and is provided with: a large diameter body section 5A for accommodating the stationary scroll member 25 and the orbiting scroll member 27 of the compressor main body; a thrust receiving section 5C, which continues from the body section 5A and has a reduced diameter in the radial direction, for forming the thrust receiving surface 5B; a medium diameter bearing support section 5E, which continues from the thrust receiving section 5C, and which has its diameter further reduced, for forming a bearing housing section 5D that houses the main bearing 13; and a small diameter boss section 5F, which continues from the bearing support section 5E, for installing the sub bearing 15 and the mechanical seal 17.

The rear housing 7 is of a dish shape and is provided with a concave section 7A for forming the discharge chamber 41, and a spigot section 7B that fits with an aperture end of the body section 5A of the front housing 5. The aforementioned seal member 47 is placed in the spigot section 7B. This rear housing 7 is connected so as to cover one end aperture of the body section 5A of the front housing 5, and the flange sections of the front housing 5 and the rear housing 7 are integrally tightly fastened and fixed by the bolt 9.

Thus, the scroll compression mechanism 23 is housed within the housing 3 having the funnel shaped front housing (low pressure side housing) 5 provided with the suction port 45, the stationary scroll member 25 and the orbiting scroll member 27 that constitute the compression mechanism main body of the scroll compression mechanism 23 are arranged in the space within the large diameter body section 5A that forms a wide opening section of the front housing 5, and a compression mechanism driving section of the scroll compression mechanism 23 comprising the crankshaft 11 and so forth is arranged in a narrow inner space section of the bearing housing section 5D, the diameter of which is smaller than that of the body section 5A. In this scroll compressor 1, a concave section 51 is formed on the outside of the thrust receiving surface 5B which is positioned on the bottom surface of the body section 5A and which supports the scroll compression mechanism 23.

Figure 2:
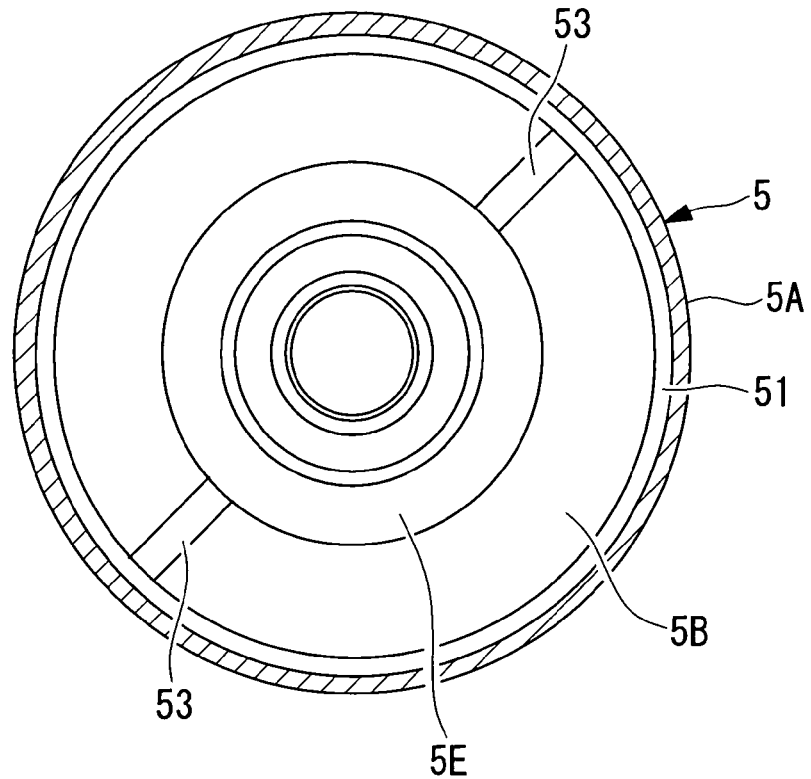
FIG. 2 is a sectional view of FIG. 1 along the line A-A.

That is to say, since the above thrust receiving section 5C is positioned on the bottom surface of the space formed as the wide opening section within the body section 5A of the front housing 5 formed in a funnel shape, the concave section 51 is formed on this thrust receiving section (bottom surface) 5C, on the outside of the thrust receiving surface 5B, in a corner section where a wall surface that forms the body section 5A meets the thrust receiving section 5C. This concave section 51 is formed around the entire outer circumference of the thrust receiving section 5C as shown in FIG. 2. Furthermore, the concave section 51 is provided such that an outer diameter of the thrust receiving section 5C, that is, an inner diameter of the concave section 51 is within a range in which the inner diameter of the concave section 51 is smaller than an envelope curve formed by an outline traced when the orbiting scroll member 27 is driven, and such that the outline of the concave section 51 is within a range where the orbiting scroll member 27 does not come in contact with the outline of concave section 51 when the orbiting scroll member 27 is driven.

Figure 3A:
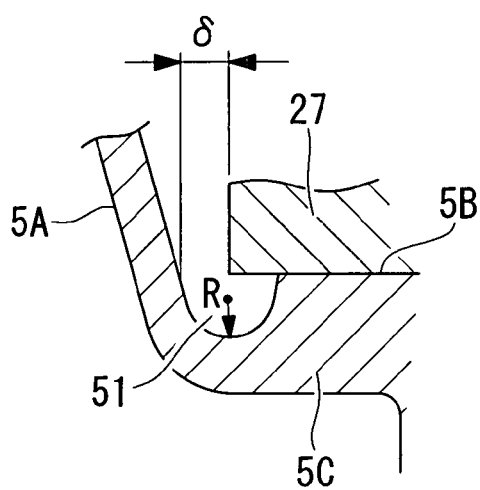
FIG. 3A is an enlarged sectional view of the essential parts of a B section of FIG. 1.

Moreover, this concave section 51 has a sectional shape of a curved surface from the wall surface that forms the body section 5A to the thrust receiving section 5C, and in particular it is preferable that it be of a sectional shape of a circular arc shape of radius R as shown in FIG. 3A. Since the cylindrical wall surface that forms the body section 5A is an inclined surface having a draft angle in which the diameter of the wall surface gradually increases as it approaches the opening section side from the thrust receiving section 5C, in consideration of the cast drafting operation when casting, the circular arc shaped concave section 51 of the radius R is smoothly and continuously formed from this inclined surface.

It is preferable that such a concave section 51 be formed using a casting surface that does not require machining processing, and if the front housing 5 is a product of aluminum alloy die casting, a smooth casting surface can be directly used. Furthermore, the thrust receiving section 5C of the front housing 5 is processed into a substantially plane surface by machining processing, however, by providing a smooth surface to the materials for the connection section of the concave section 51 and the thrust receiving section 5C in the casting step, burr processing after the machining processing can be omitted.

Moreover, since the concave section 51 is provided with a circular arc shape of radius R, this circular arc can be utilized in the corner section of the front housing 5 as a curved surface for securing strength. Since such a curved surface does not affect preservation of the gap section δ, it is advantageous for reducing size.

Moreover, for the concave section 51, it is preferable that the space that communicates with the suction port 45 and the space of the narrow section in which the crankshaft 11 and so forth are arranged be communicates with each other by providing concave groove sections, which are communicating passages 53, in the thrust receiving surface 5B in a radial pattern. By providing these communicating passages 53, some portion of the low temperature, low pressure refrigeration gas introduced from the suction port 45 travels through the communicating passages 53 to be supplied into the narrow space section.

The scroll compressor constructed as described above operates as described below.

When a rotation driving force is transmitted from an external driving force source via a pulley and electromagnetic clutch (not shown in the diagram) to the crankshaft 11 to rotate the crankshaft 11, the orbiting scroll member 27 connected to the eccentric pin 11C of the crankshaft 11 via the drive bush 19 and the drive bearing 21, is orbitally driven around the stationary scroll member 25 while being prevented from rotating by the rotation prevention mechanism 33. As a result, the refrigeration gas inside the intake chamber 43 is sucked into the crescent shaped compression chambers 29 formed in the two outermost places in the radial direction. Since the scroll compression mechanism 23 comprising the orbiting scroll member 27 and the stationary scroll member 25 generally has two suction ports in two positions directly opposed to each other at approximately 180 degrees in this way, at this time, the spaces of the gap section δ formed between the inner surface of the body section 5A and the scroll compression mechanism 23, and the concave section 51, serve as passages for guiding the refrigeration gas from the suction port 45 to the compression mechanism suction ports in two places, that is to say, for guiding the refrigeration gas into the compression chambers 29.

After intake of the compression chamber 29 has been closed at a predetermined rotational angle, the compression chamber 29 shifts towards the center side while its capacity is reduced. During this time, the refrigeration gas is compressed, and when the compression chamber 29 has reached the position that communicates with to the discharge port 25C, the discharge reed valve 37 is pushed open and the compressed gas is discharged into the discharge chamber 41, and it is further discharged to outside of the scroll compressor 1 through the discharge chamber 41.

Thus, according to the present invention described above, since a sectional area of the passage for gaseous fluid is secured by forming the concave section 51 on the outside of the thrust receiving surface 5B that supports the compression mechanism, the diameter of the housing 3 can be reduced by reducing the dimensions of the gap section 6. Furthermore, in the present invention, since the circular arc shaped concave section 51 of radius R is provided, there is an advantage in that the outer dimensions can be reduced compared to conventional dimensions by the amount of the reduction in the effect of interference between the housing 3 and the orbiting scroll member 27 when the orbiting scroll member 27 is driven.

Figure 3B:
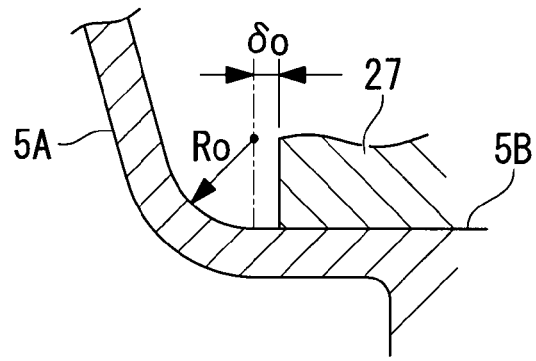
FIG. 3B is a sectional view of the essential parts of a conventional structure of the B section of FIG. 1.

This point is described in detail with reference to FIG. 3A showing the present invention, and FIG. 3B showing a conventional example.

In the conventional example, the outer diameter of the compressor has to be made large, since a gap of $\delta_0$ is secured so as not to interfere with the outermost section of the orbiting scroll member 27 when it is driven, and a sidewall base R is provided to avoid stress concentration on the sidewall. Conversely, according to the present invention, since the concave section 51 of radius R is provided, the $\delta_0$ gap is not required and the curved surface for securing strength can be provided further on the inner side (center side) within a range where it does not interfere with the outermost end section of the orbiting scroll during the driving operation. In this case, the draft angle of the aluminum die cast housing 3 is necessary as with the conventional example, however, since the rise of the sidewall can be provided further towards the inside, a reduction in the outer diameter of the compressor can be achieved.

Moreover, by providing a deeper concave section 51 in the present invention, the capacity of the housing interior can be further increased while securing the outer diameter of the housing. In this case, a muffler effect is achieved by which it becomes possible to reduce pulsation generated by the compressor, and this in turn may contribute to a reduction in vibration and noise. Here, by providing the concave section 51 on the outside of the thrust receiving surface 5B, an increase in the axial direction dimension of the scroll compressor 1 becomes a concern. However, since there are generally existing components in the vicinity of the position on the thrust receiving surface 5B in which the concave section is provided, in actuality there is not an axial direction increase in the scroll compressor 1.

Furthermore, a technique of providing a separate anti-wear plate between the thrust receiving section 5C and the orbiting scroll member 27 of the scroll compressor 1 is commonly known. Of course, even in this kind of case, the invention of the present application enables effects similar to that described above.

Moreover, the aforementioned embodiment was described with the example of the scroll compressor 1, however, the present invention is not limited to this. The present invention can be universally applied to other forms of compressors such as a rotary compressor, a screw compressor, and an in-line piston pump compressor, and also to fluid machines other than compressors such as a similar kind of pump for handing fluid.

Second Embodiment

Hereinafter, a second embodiment of the present invention is described, with reference to FIG. 4 and FIG. 5. A scroll compressor 101 according to the present embodiment is used for compression of refrigeration gas (fluid) of an air conditioning apparatus for example.

Figure 4:
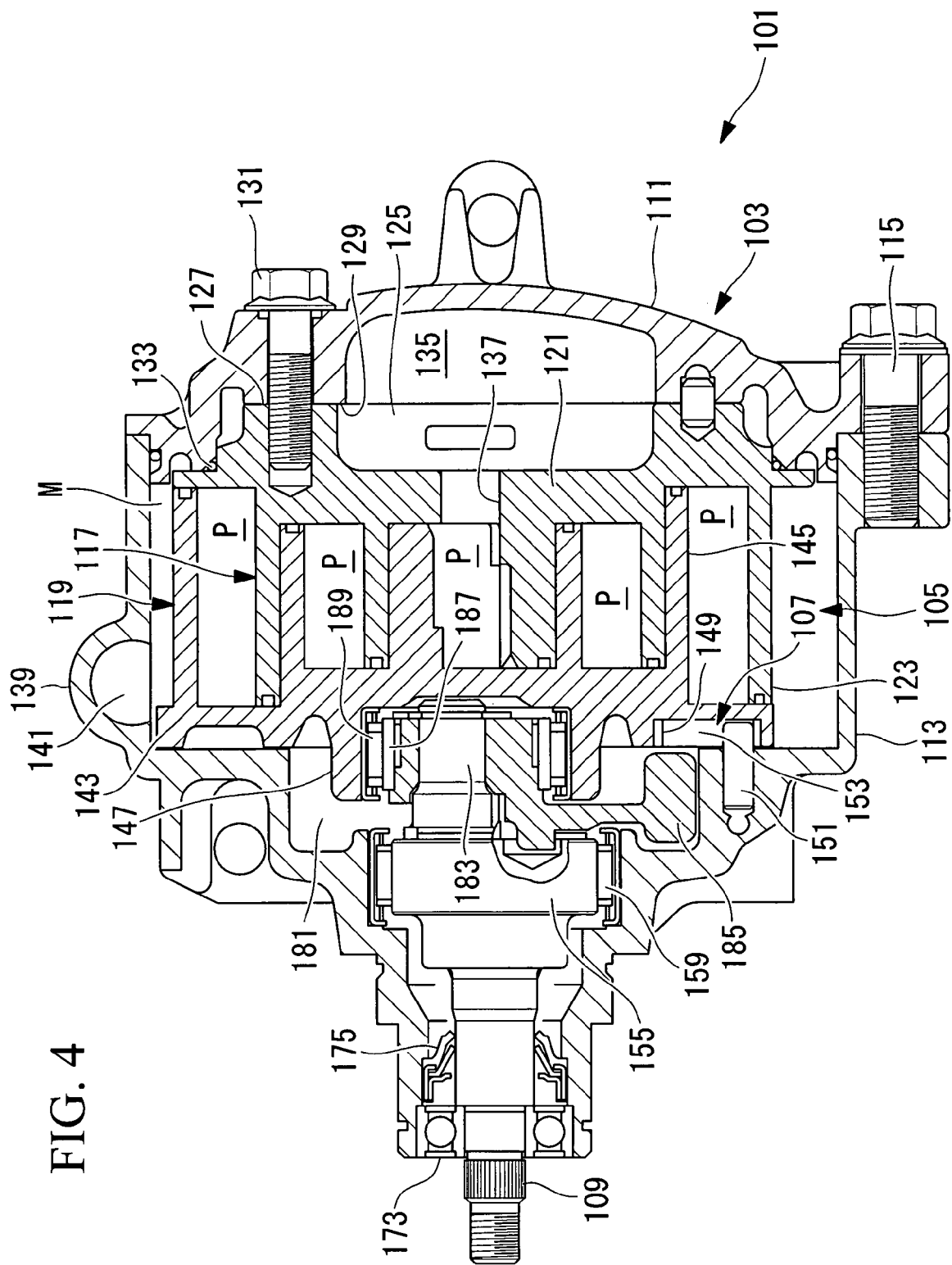
FIG. 4 is a sectional view showing an overall schematic construction of a scroll compressor according to a second embodiment of the present invention.

FIG. 4 is a sectional view for explaining a construction of the scroll compressor 101 according to the present embodiment. FIG. 5 is a cutaway sectional view showing one part of a large diameter shaft section.

The scroll compressor 101 is provided with a housing 103, a scroll compression mechanism (compression mechanism) 105, a rotation prevention section 107, and a crankshaft 109.

The housing 103 is a hermetic container within which the scroll compression mechanism 105 and so forth are arranged as shown in FIG. 4.

The housing 103 is provided with a rear case 111 that constitutes a rear section (upper side in FIG. 4) and a front case 113 that constitutes a front section (lower section in FIG. 4).

The rear case 111 is hollow and has a substantially dome shape, and it is formed by means of aluminum alloy casting.

The front case 113 has a joint shape of a hollow cylinder and a circular cone, and is formed by means of aluminum alloy casting.

The rear case 111 and the front case 113 are joined by being fastened by bolts 115, and an enclosed space M (intake space) is formed therein.

The scroll compression mechanism 105 is provided with a stationary scroll 117 and an orbiting scroll 119.

The stationary scroll 117 is provided with a stationary end plate 121 and a spiral shaped stationary spiral body (spiral wrap) 123 standing upright on the front face of the stationary end plate 121.

On the rear side of the stationary end plate 121 is formed a concave section 125 recessed towards the front side in the center section, and a rear end surface 127 that surrounds the circumference of the concave section 125 in a ring shape.

The rear end surface 127 is abutted against an end surface 129 provided in a ring shape on the front of the rear case 111, and the stationary scroll 117 is fixed and attached to the rear case 111 by fastening at a plurality of places by bolts 131.

At this time, since the rear case 111 and the stationary scroll 117 are sealed off from the enclosed space M by a seal 133 such as an O-ring, a hollow section of the rear case 111 and the concave section 125 of the stationary end plate 121 form a discharge chamber 135.

A discharge port 137 for compressed fluid is formed in a substantially center section of the concave section 125 of the stationary end plate 121. This discharge port 137 is opened and closed by a discharge valve (not shown in the diagram) that is attached to the rear surface of the stationary end plate 121, and which discharges compressed fluid into the discharge chamber 135.

An intake boss section 139 is provided on a front end section of a cylindrical section of the front case 113.

A suction port section 141 that communicates with the enclosed space M and introduces refrigeration gas (fluid) from outside into the enclosed space M, is cut out in the intake boss section 139.

The orbiting scroll 119 is provided with an orbiting end plate 143 and a spiral shaped orbiting spiral body (spiral wrap) 145 standing upright on the rear surface of this orbiting end plate 143.

The orbiting scroll 119 is provided in such a way that the orbiting spiral body 145 meshes with the stationary spiral body 123.

The stationary scroll 117 and the orbiting scroll 119 mesh with each other so as to be eccentric to each other by a predetermined distance, while having a 180 degree phase difference. As a result, compression chambers P, which are enclosed spaces, are formed in a plurality of point-symmetric positions with respect to the centers of the stationary spiral body 123 and the orbiting spiral body 145.

A cylindrical hollow orbiting boss 147 is provided on the front surface center of the orbiting end plate 143 (the left side in FIG. 4 (crankshaft 109 side)) so as to project forward.

The orbiting scroll 119 is supported on the front case 113 so that it can orbit around the stationary scroll 117.

The rotation prevention section 107 is provided with a plurality of rings 149 and a plurality of pins 151.

The respective rings 149 are pressed fitted, or fitted so as to allow some play, (inserted with play) into a plurality of ring holes 153 provided at substantially equal intervals on the outer circumference side of the front side end surface of the orbiting end plate 143 on a circumference of a predetermined radius from the center of the orbiting scroll 119.

The numbers of the pins 151 and the rings 149 provided are equal, and the respective pins 151 are inserted and fitted into a rear side end surface of the circular cone base section of the front case 113 so as to project into the corresponding rings 149.

By inserting the pins 151 into the rings 149 so as to allow play (inserting with play), the orbiting scroll 119 fits with the front case 113 so that rotation of the orbiting scroll 119 is prevented when it orbits. At this time, the pin 151 revolves along an inner circumferential surface of the ring 149 in a direction the same as the orbiting direction of the orbiting scroll 119.

For example, a commonly known Oldham ring may be used as the rotation prevention section 107.

The crankshaft 109 is arranged so as to extend from the front side where the crankshaft 109 is exposed on the outside of the FIG. 4 scroll compressor to the rear side that is inside of the FIG. 4 scroll compressor adjacent to the eccentric shaft (eccentric member) 183 at the large diameter shaft section 155. This large diameter shaft section 155 provided on the rear side of the crankshaft 109 has an outer circumferential surface 157 (illustrated in FIGS. 5-8) that is rotatably supported on the front case 113 via a large diameter shaft section needle bearing 159 (needle shaped roller bearing having an outer ring shown in more detail in FIGS. 5-8).

Figure 5:
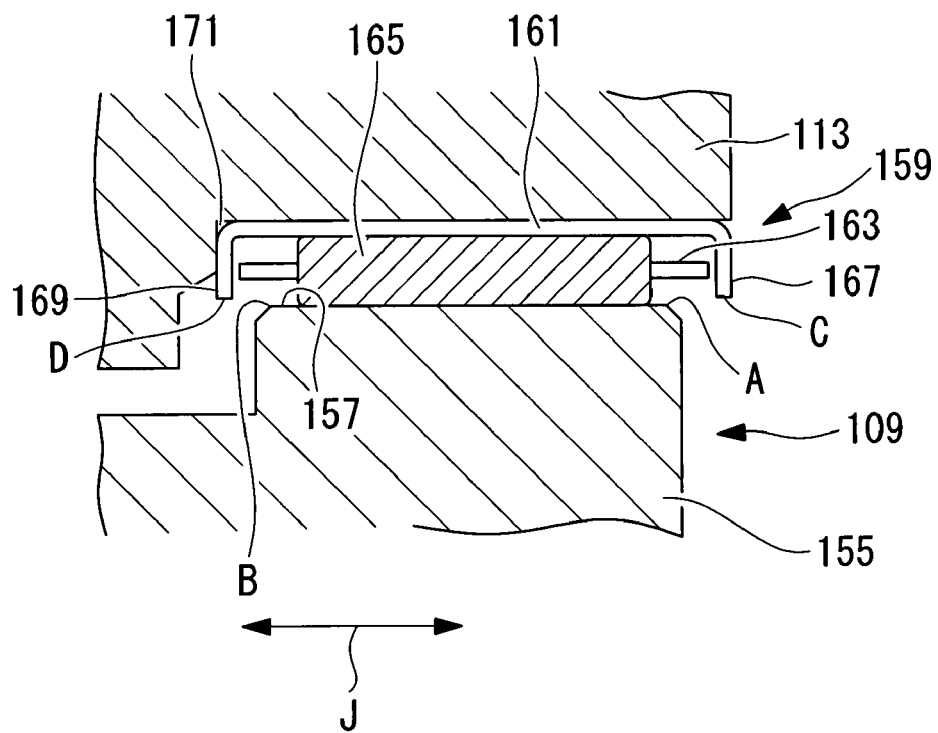
FIG. 5 is a partial sectional view showing a relationship between a needle bearing for a large diameter shaft section and the large diameter shaft section according to the second embodiment of the present invention.

The large diameter shaft section needle bearing 159 is constructed, as shown in FIG. 5, from an outer ring 161, a cage 163, and a plurality of needle shaped rollers 165.

The outer ring 161 is of a substantially hollow cylindrical shape, and has a rear collar section 167 (shown on the right side of outer ring 161 in FIGS. 5-8 that corresponds to the below-noted inside facing side of the outer ring) and a front collar section 169 (shown on the left side of outer ring 161 in FIGS. 5-8 that corresponds to the below-noted outside facing side of the outer ring). Both of the collar sections respectively bend inwards at right angles and are formed on both the left side and right side of the outer ring 161 as corresponding end sections in an axial direction J of the crankshaft 109. The reference character J of FIG. 5 is shown with arrow heads on the right side end and left side end. The arrow head on the left side of FIG. 5 points or faces away from a left side end portion of the large diameter shaft section 155 and the left side end portion 169 of outer ring 161 towards the outside of the scroll compressor away from the eccentric member 183 while the arrow head on the right side of FIG. 5 points or faces away from the right side end portion of the large diameter shaft section 155 and the right side end portion 167 of outer ring 161 towards the eccentric member 183 on the inside of the scroll compressor. Thus, the large diameter shaft section 155 and the outer ring 161 that are illustrated in FIG. 5 are clearly shown as having outside facing end portions (the left side of the large diameter shaft section 155 and the left side 169 of the outer ring 161) that are both directed away from the eccentric member (183 in FIG. 4). Also, the large diameter shaft section 155 and the outer ring 161 that are illustrated in FIG. 5 are clearly shown as having inside facing end portions (the right side of the large diameter shaft section 155 and the right side 167 of the outer ring 161) that are both directed away from the eccentric member (183 in FIG. 4).

The cage 163 is attached on the inside of the outer ring 161, holding the plurality of needle shaped rollers 165 at substantially equal intervals in the circumferential direction.

The large diameter shaft section needle bearing 159 is held by being tightly fitted into a concave section 171 provided in a substantially middle section in the axial direction J of the circular cone section of the front case 113.

Small chamfers are provided on both of the end sections of the large diameter shaft section 155 in the axial direction J. The portion of the outer surface of the large diameter shaft section 155 that remains inside of these chamfers (portion positioned between these chamfers) comprises the above-noted outer circumferential surface 157. It is clear from FIG. 5 That this illustrated outer circumferential surface 157 extends in a plane along a direction parallel to a direction of extension of the central axis of the large diameter shaft section (J) that extends between the above-noted inside facing end portion of the large diameter shaft section 155 (right side in FIG. 5) and the above-noted outside facing end portion of the large diameter shaft section 155 (left side in FIG. 5).

A rear end position A that forms an inside end of the outer circumferential surface 157 is shown by FIGS. 5-8 as being positioned nearer to the inside facing end portion of the large diameter shaft section 155 on the illustrated right side of this large diameter shaft section 155 and the inside facing end portion 167 on the illustrated right side of the outer ring 161 than the outside facing end portion of the large diameter shaft section 155 on the illustrated left side of this large diameter shaft section 155 and the outside facing end portion 169 on the illustrated left side of the outer ring 161 shown as end position C. Thus, the circumferential surface has an inside end illustrated in FIG. 5 as "A" that is nearer to the above-noted inside facing end portions of the large diameter shaft section and the outer ring (on the right side of these elements shown in FIGS. 5-8) than the above-noted outside facing end portions thereof (on the left side of these elements shown in FIGS. 5-8). Also, the circumferential surface has an inside end illustrated in FIG. 5 as "A" that is spaced from the inside facing end portion of the large diameter shaft section 155 on the illustrated right side of this large diameter shaft section 155.

Also, a front end position B that forms an outside end of the outer circumferential surface 157 is shown by FIGS. 5-8 as being positioned nearer to the outside facing end portion of the large diameter shaft section 155 on the illustrated left side of this large diameter shaft section 155 and the outside facing end portion 169 on the illustrated left side of the outer ring 161 than the inside facing end portion of the large diameter shaft section 155 on the illustrated right side of this large diameter shaft section 155 and the inside facing end portion 167 on the illustrated right side of the outer ring 161 shown as end position D. Thus, the circumferential surface further has an outside end illustrated in FIG. 5 as "B" that is nearer to the above-noted outside facing end portions of the large diameter shaft section and the outer ring (on the left side of these elements shown in FIGS. 5-8) than the above-noted inside facing end portions thereof (on the right side of these elements shown in FIGS. 5-8). Also, the circumferential surface has an outside end illustrated in FIG. 5 as "B" that is spaced from the outside facing end portion of the large diameter shaft section 155 on the illustrated left side of this large diameter shaft section 155.

Figure 6:
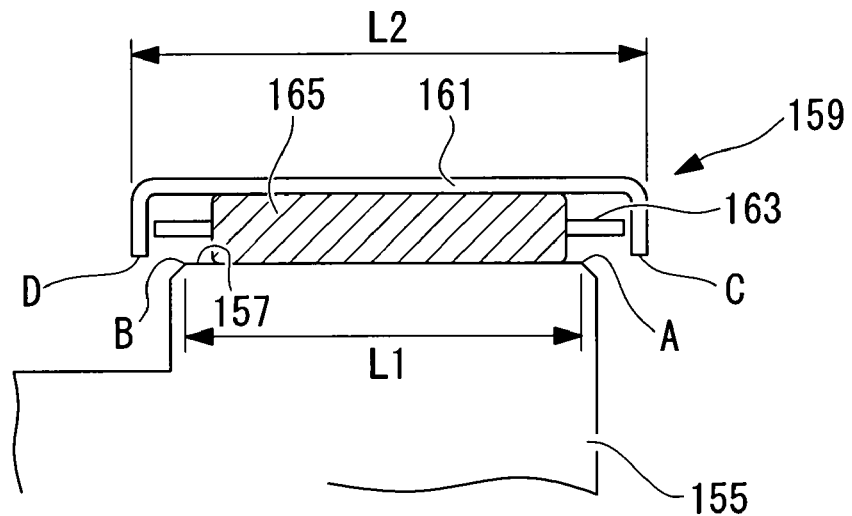
FIG. 6 is a partial sectional view showing a portion similar to that of FIG. 5.

Furthermore, as shown in FIG. 6, the length L1 of the outer circumferential surface 157 in the axial direction J is made shorter than length L2 of the outer ring 161 in the axial direction J.

Since the intermediate positions of the outer circumferential surface 157 and the outer ring 161 in the axial direction J are substantially aligned, the aforementioned gaps are respectively provided in the front and rear of the outer circumferential surface 157.

A gap between the front end position B of the outer circumferential surface 157 and the tip end position D of the front collar section 169 is provided for lubricating a lip seal 175 (refer to FIG. 4). Accordingly, in the case where the need for lubrication of the lip seal 175 is obviated by providing a separate lubrication means, this gap may not need to be provided.

The length L1 of the outer circumferential surface 157 in the axial direction J is formed to be longer than the length of the needle shaped roller 165 so that the load applied on the needle shaped roller 165 will not be biased.

As shown in FIG. 4, a front end of the crankshaft 109 projects ahead of the front case 113, and is rotatably attached to the front case 113 by a ball bearing 173 provided in the front end section of the front case 113.

On the side of the crankshaft 109 to the rear of the ball bearing 173, the enclosed space M is sealed off from outside by the lip seal (seal member) 175 formed from a mechanical seal.

The front end section of the crankshaft 109 projecting from the front case 113 is constructed so as to be rotated by a driving device such as an engine or a motor (not shown in the diagram).

A crank chamber 181 into which the orbiting boss 147 is inserted with some clearance is provided in the center section of the rear side of the circular cone section of the front case 113.

The rear side end sections of the large diameter needle bearing 159 and the large diameter shaft section 155 face the crank chamber 181.

An eccentric shaft (eccentric member) 183, the axial center of which is eccentric, is provided on the rear side of the large diameter shaft section 155 of the crankshaft 109 so as to be positioned within a hollow section of the orbiting boss 147.

A counter weight 185 is provided around the eccentric shaft 183. The counter weight 185 covers the eccentric shaft 183 and is arranged within the crank chamber 181 so that its front end section extends in a direction (right direction in FIG. 4) opposite to the eccentric direction (left direction in FIG. 4) of the eccentric shaft 183, and is fixed on and attached to the large diameter shaft section 155.

An eccentric bush 187 surrounds the circumference of the cylindrical counter weight 185 that is positioned within the orbiting boss 147, and is freely rotatably fitted within the hollow section of the orbiting boss 147 via the needle bearings 189.

The axial center of the eccentric bush 187 is eccentric with respect to the axial center of the crankshaft 109.

The eccentric bush 187 transmits the rotational driving force of the crankshaft 109 to the orbiting scroll 119 to perform the function of orbitally driving the orbiting scroll 119.

The compression operation of the scroll compressor 101 constructed as described above is described.

Rotational driving force from an engine or a motor (not shown in the diagram) is transmitted to the crankshaft 109, and this rotational driving force is transmitted to the orbiting scroll 119 of the scroll compression mechanism 105 via the eccentric shaft 183, the counter weight 185, the eccentric bush 187, and the orbiting boss 147.

The orbiting scroll 119, rotation of which is prevented by the rotation prevention section 107, is driven so as to revolve around a circular orbit with a radius of the orbiting radius.

When the orbiting scroll 119 is orbitally driven, refrigeration gas enters the enclosed space M of the housing 103 via the suction port section 141 and it is sucked into a compression chamber P of the scroll compression mechanism 105.

At this time, since lubrication oil contained in the refrigeration gas is introduced into the compression chamber P together with the refrigeration gas, the scroll compression mechanism 105 is lubricated.

As the capacity of the compression chamber P is reduced by the orbital motion of the orbiting scroll 119, the refrigeration gas reaches the compression chamber P of the center section while it is being compressed.

The compressed refrigeration gas that reaches the compression chamber P of the center section is discharged from the discharge port 137 to the discharge chamber 135.

The compressed refrigeration gas that has been discharged into the discharge chamber 135 is supplied to a radiator through a discharge hole (not shown in the diagram).

At this time, the counter weight 185 is rotated by the eccentric shaft 183 of the crankshaft 109 in a phase shifted substantially 180 degrees from the orbital motion of the orbiting scroll 119. Therefore, the counter weight 185 cancels out the centrifugal force that acts on the orbiting scroll 119, and unbalance of the dynamic mass around the crankshaft 109 is reduced.

Moreover, since the counter weight 185 rotates whereas the orbiting scroll 119 revolves, a tip end of the counter weight 185 arranged within the crank chamber 181 rotates relatively inside the crank chamber 181.

Next, the lubrication operation related to the crankshaft 109 is described.

The low temperature and low pressure refrigeration gas that has been sucked into the enclosed space M flows into the crank chamber 181 that forms the enclosed space M.

The refrigeration gas, which contains lubrication oil and which has flowed into the crank chamber 181, travels through the gap formed between the rear end position A that forms the above-noted inside end of the outer circumferential surface 157 as shown by FIGS. 5-8 and the tip end position C that forms the above-noted inside end rear collar section 167 of the outer ring 161, and is introduced into the large diameter shaft section needle bearing 159.

Since the large diameter shaft section needle bearing 159 is cooled and lubricated by this refrigeration gas and lubrication oil, the temperature within the enclosed space M becomes uniform and lubricating properties can be improved.

The refrigeration gas introduced into the large diameter shaft section needle bearing 159 travels through the gap formed between the front end position B that forms the above-noted inside end of the outer circumferential surface 157 as shown by FIGS. 5-8 and the tip end position D that forms the above-noted inside end front collar section 169 of the outer ring 161 and reaches the lip seal 175, and it cools and lubricates the lip seal 175.

Thus, since a gap for introducing the refrigeration gas to the large diameter shaft section needle bearing 159 is secured by positioning the rear end position A of the outer circumferential surface of the large diameter shaft section 155 to the front side of the tip end position C of the rear collar section 167, and since a gap for introducing the refrigeration gas to the lip seal 175 is secured by positioning the front end position B of the outer circumferential surface 157 to the rear side of the tip end position D of the front collar section 169, a generic needle bearing can be employed for the large diameter shaft section needle bearing 159 resulting in a reduction in production cost.

Meanwhile, the refrigerant introduced into the crank chamber 181 is introduced into the needle bearing 189 to be used for cooling and lubricating the needle bearing 189 and so forth.

Moreover, since the large diameter shaft section needle bearing 159 is used, the size of the front case 113 does not need to be increased, and a reduction in size and weight of the housing can be achieved.

Figure 7:
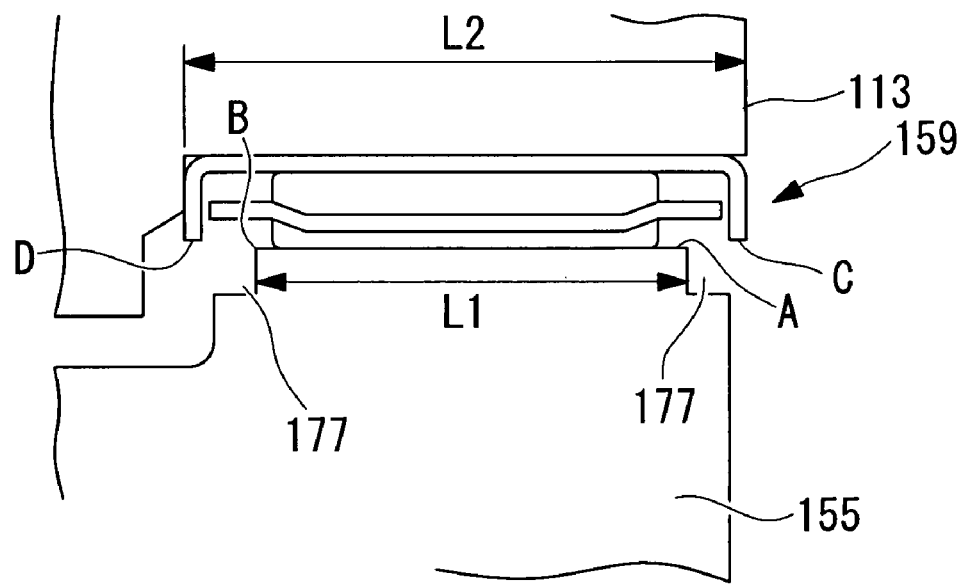
FIG. 7 is a partial sectional view of a portion similar to that of FIG. 5 showing another embodiment of the large diameter shaft section according to the second embodiment of the present invention.
Figure 8:
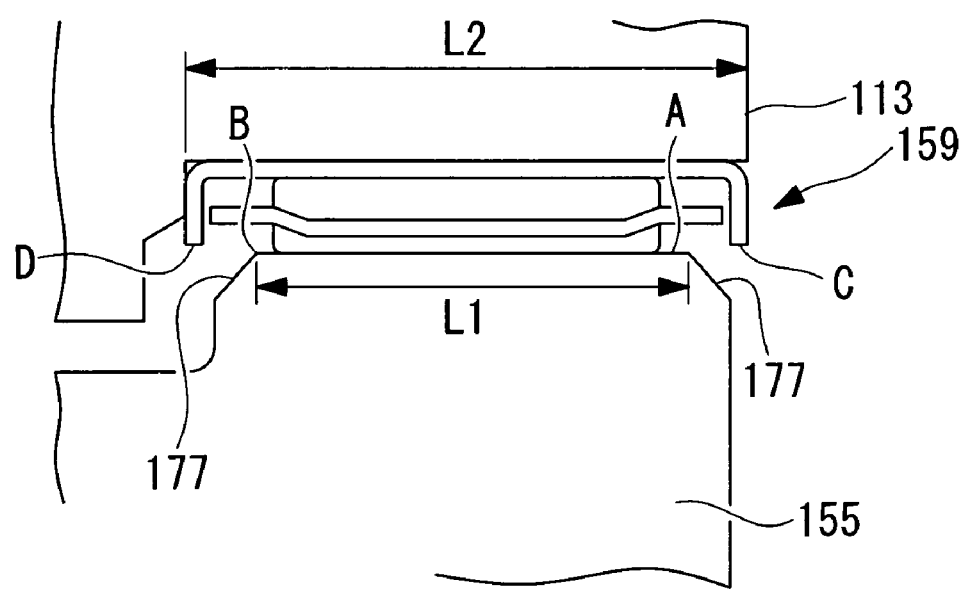
FIG. 8 is a partial sectional view of a portion similar to that of FIG. 5 showing yet another embodiment of the large diameter shaft section according to the second embodiment of the present invention.

In the present embodiment, small chamfers are provided on the front and rear ends of the large diameter shaft section 155. However, cutaway sections 177 that continue in the circumferential direction and have large rectangular shaped sections as shown in FIG. 7, or cutaway sections 177 having large triangular shape sections as shown in FIG. 8 may be provided.

Moreover, the shape of the section of the cutaway section 177 is not limited to these, and it may be an arbitrary shape. Furthermore, it may be discontinuous in the circumferential direction.

In this way, the length of the large diameter shaft section 155 in the axial direction J can be made greater while securing the gap between the outer ring 161 of the large diameter shaft section needle bearing 159 and the shaft section 155.

Third Embodiment

Hereinafter, a third embodiment of the present invention is described, with reference to FIG. 9 through FIG. 11.

Figure 9:
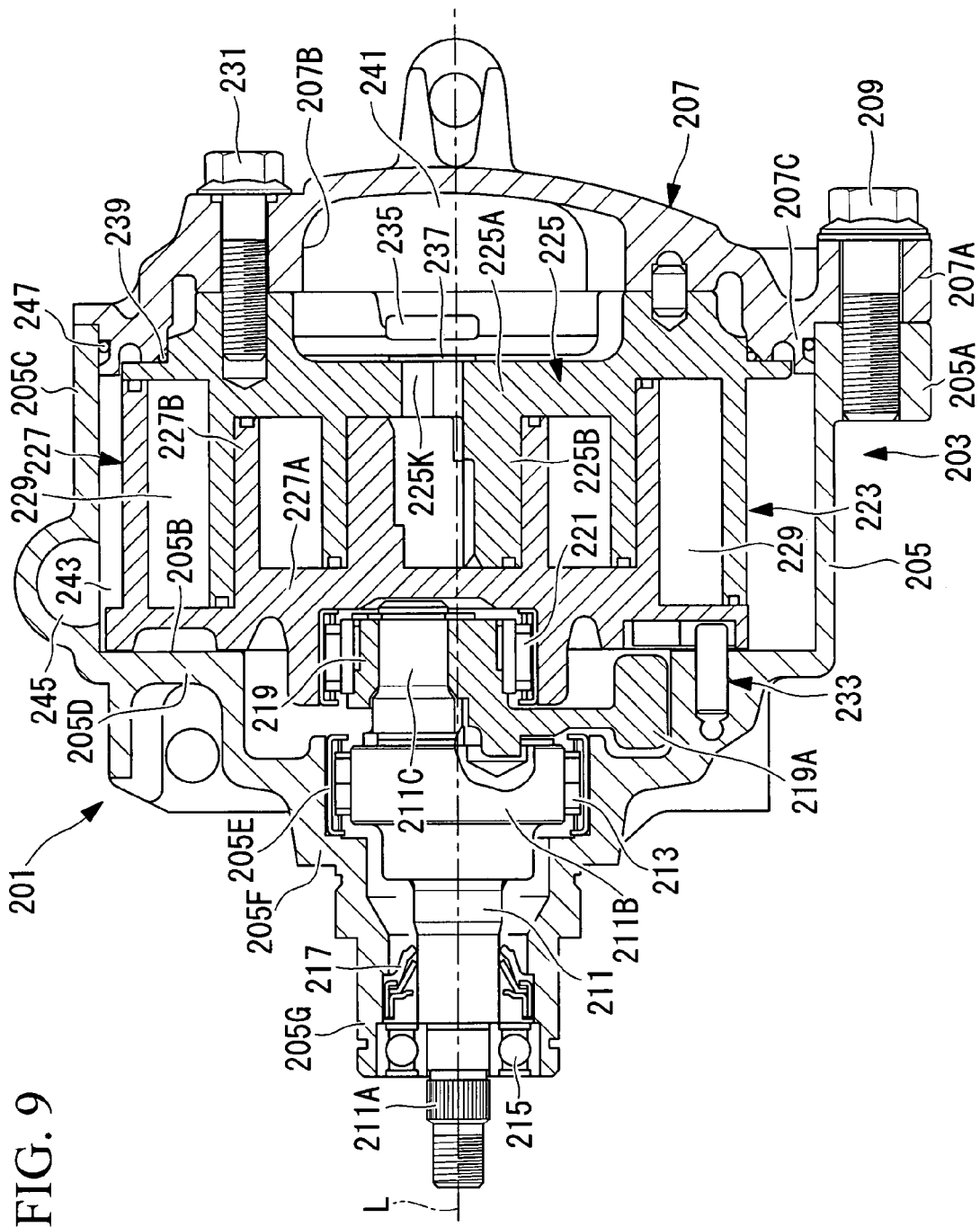
FIG. 9 is a longitudinal sectional view showing a scroll compressor according to a third embodiment of the present invention.

FIG. 9 is a longitudinal sectional view showing a scroll compressor 201 according to a third embodiment of the present invention.

The scroll compressor 201 has a housing 203 that constructs an outline thereof. This housing 203 is constructed by integrally fastening and fixing a front housing 205 and a rear housing 207 by bolts 209 (second bolts). Flanges 205A and 207A for fastening are integrally formed at equal intervals in a plurality of places, for example in four places, on each of the circumferences of the front housing 205 and the rear housing 207. By fastening these flanges 205A and 207A to one another using the bolts 209, the front housing 205 and the rear housing 207 are integrally joined.

A crankshaft 211 is supported within the front housing 205 via a main bearing 213 and a sub bearing 215, allowing it to rotate freely around the axis L. One end side (left side in the diagram) of the crankshaft 211 is a small diameter shaft section 211A. This small diameter shaft section 211A passes through the front housing 205 and projects to the left side in FIG. 9. As is commonly known, an electromagnetic clutch, a pulley and so forth (not shown in the diagram) that receive power, are provided on the projecting section of the small diameter shaft section 211A, and power is transmitted thereto via a V belt from a driving force source (not shown in the diagram) such as an engine.

Furthermore, a mechanical seal (lip seal) 217 is installed between the main bearing 213 and the sub bearing 215 to air tightly seal between inside the housing 203 and the atmospheric air.

A large diameter shaft section 211B is provided on the other end side (right side in FIG. 9) of the crankshaft 211. Furthermore, an eccentric pin 211C, which is eccentric to the axis L of the crankshaft 211 by a predetermined distance, is provided integrally on the large diameter shaft section 211B. This large diameter shaft section 211B and the small diameter shaft section 211A are respectively supported within the front housing 205 to allow free rotation, through the main bearing 213 and the sub bearing 215. An orbiting scroll member 227 described later is connected to the eccentric pin 211C via a drive bush 219 and a drive bearing 221. Therefore, by rotating the crankshaft 211, the orbiting scroll member 227 is orbitally driven.

A balance weight 219A for canceling an unbalanced load occurring as a result of the orbiting scroll member 227 being orbitally driven, is formed integrally on the drive bush 219. This balance weight 219A orbits together with orbital drive of the orbiting scroll member 227.

A pair of a stationary scroll member 225 and the orbiting scroll member 227 that constitute a scroll compression mechanism 223, is fitted into the interior of the housing 203. The stationary scroll member 225 is constructed from an end plate 225A and a spiral wrap 225B standing upright on the end plate 225A. Meanwhile, the orbiting scroll member 227 is constructed from an end plate 227A and a spiral wrap 227B standing upright on the end plate 227A.

Figure 10A:
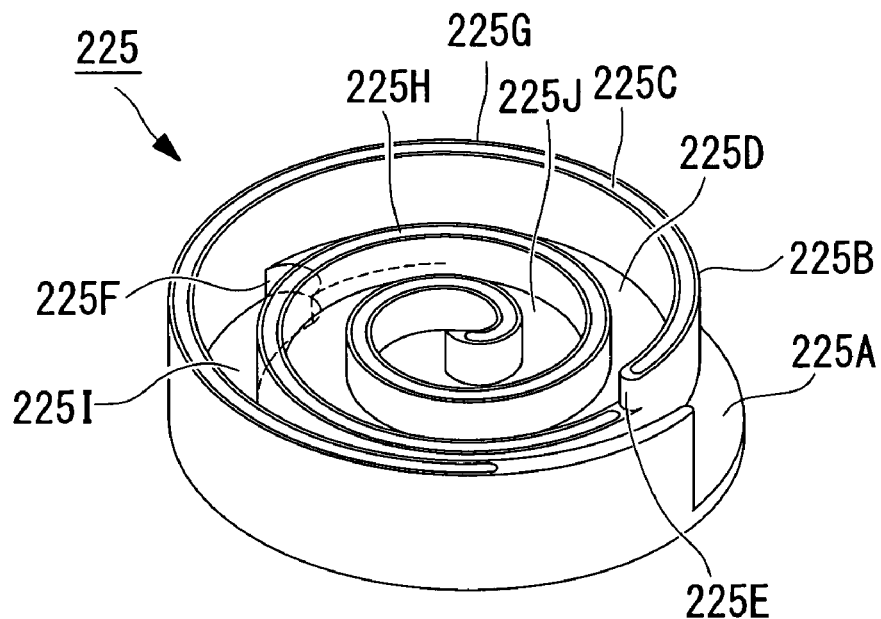
FIG. 10A is an external perspective view showing a stationary scroll member and an orbiting scroll member of the scroll compressor shown in FIG. 9.
Figure 10B:
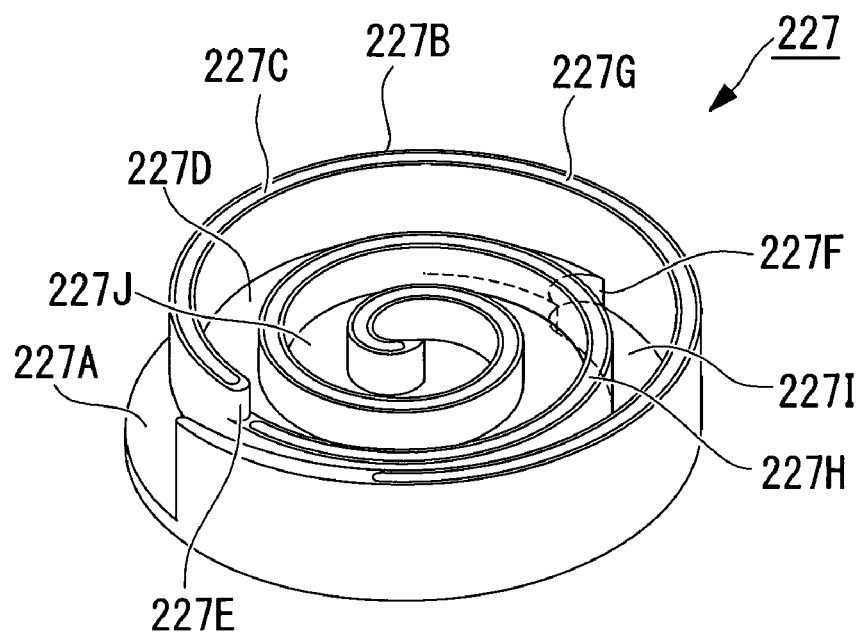
FIG. 10B is an external perspective view showing a stationary scroll member and an orbiting scroll member of the scroll compressor shown in FIG. 9.

In the stationary scroll member 225 and the orbiting scroll member 227, as shown in FIG. 10A and FIG. 10B, step sections 225E, 225F and 227E, 227F are provided respectively on the tip end surfaces 225C, 227C and the bottom surfaces 225D, 227D of the spiral wraps 225B, 227B in predetermined positions along their spiral direction. Taking these step sections 225E, 225F and 227E, 227F as boundaries, in the wrap tip end surfaces 225C and 227C, tip end surfaces 225G and 227G on the outer circumference side are higher in the axis L direction and tip end surfaces 225G and 227H on the inner circumference side are lower. Moreover, in the bottom surfaces 225D and 227D, bottom surfaces 225J and 227I on the outer circumference side are lower in the axis L direction and bottom surfaces 225J and 227J on the inner circumference side are higher. As a result, the heights of the spiral wraps 225B and 227B on the outer circumference side are higher than those of the wraps on the inner circumference side.

The above pair of the stationary scroll member 225 and the orbiting scroll member 227 are meshed together in a state where each of their centers is distanced from the other by the orbital radius amount, and where the spiral wraps 25B and 27B are meshed with each other with a 180 degree phase shift. As a result, as shown in FIG. 9, a pair of compression chambers 229 limited by the end plates 225A, 227A and the spiral wraps 225B, 227B are formed between both of the scroll members 225 and 227 in symmetry with respect to the center of the scroll. The height of the compression chamber 229 in the axis L direction on the outer circumference side of the spiral wraps 225B and 227B is higher than that on the inner circumference side. As a result, a compression mechanism that enables three dimensional compression capable of compression in the circumferential direction and in the wrap height direction is attained.

The stationary scroll member 225 is fixed and installed on the inner surface of the rear housing 207 using bolts 231 (first bolts). The orbiting scroll member 227 is orbitally driven by the eccentric pin 211C connected as described above via the drive bush 219 and the drive bearing 221 to the boss section provided on the back surface of the end plate 227A.

The back surface of the end plate 227A of the orbiting scroll member 227 is supported on a thrust receiving surface 205B formed in the front housing 205. The orbiting scroll member 227 is prevented from rotating by a rotation prevention mechanism 233, such as a pin ring or an Oldham ring, that intervenes between this thrust receiving surface 205B and the end plate 227A, so as to be orbitally driven around the stationary scroll member 225.

An opening of a discharge port 225K for discharging compressed refrigeration gas, is provided in the center section of the end plate 225A of the stationary scroll member 225. In this discharge port 225K, a discharge reed valve 237 is attached to the end plate 225A via a retainer 235. Furthermore, a seal member 239 (first seal member) such as an O-ring is placed on the back surface side of the end plate 225A of the stationary scroll member 225 to make tight contact with the inner surface of the rear housing 207. As a result, a discharge chamber 241 that is separate from the inner space of the housing 203 is formed between the end plate 225A and the rear housing 207. Accordingly, the inner space of the housing 203 apart from the discharge chamber 241 is constructed to function as an intake chamber 243. Refrigeration gas returning from a refrigeration cycle via a suction port 245 provided in the front housing 205 is sucked into the intake chamber 243, and the refrigeration gas is sucked into the compression chamber 229 via this intake chamber 243. Moreover, a seal member 247 such as an O-ring (second seal member) is placed on a joint surface between the front housing 205 and the rear housing 207 to air tightly seal the intake chamber 243 formed within the housing 203 from the atmospheric air.

Here, as shown in FIG. 9, the front housing 205 is provided with: a large diameter body section 205C that houses the scroll compression mechanism 225; a thrust receiving section 205D that continues from the body section 205C and has its diameter reduced in the radial direction (it extends from the end section of the body section 205C towards the inner circumference side), for forming the aforementioned thrust receiving surface 205B; a medium diameter crankshaft support section 205F that continues from the thrust receiving section 205D and has its diameter further reduced, for forming a bearing housing section 205E to house the main bearing 213; and a small diameter boss section 205G that continues from the crankshaft support section 205F, for installing the sub bearing 215 and mechanical seal 217. That is to say, the front housing 205 is formed so as to form a funnel shaft, the diameter of which is reduced in steps.

Figure 11:
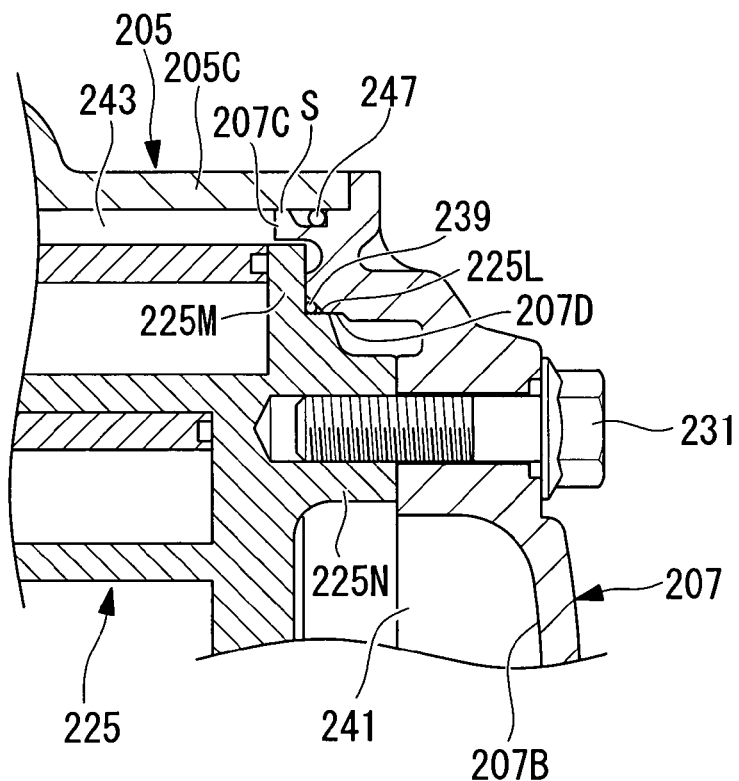
FIG. 11 is a partial enlargement of a sectional view showing the scroll compressor shown in FIG. 9.

On the other hand, as shown in FIG. 11, the rear housing 207 is formed in a dish shape, and is provided with: a concave section 207B for forming the discharge chamber 241; a spigot section 207C that fits with an opening end of the body section 205C of the front housing 205; and an fitting section 207D with which a spigot section 225L provided on the back surface of the end plate 225A of the stationary scroll member 225 fits. The fitting section 207D is formed on the outer circumference side of the position where the bolts 231 are fastened.

The spigot section 207C has a substantially cylindrical shape. The above seal member 247 is placed on the outer circumferential surface of the spigot section 207C. Moreover, on the outer circumferential surface of the spigot section 207C, on the mouth side (tip end side) of the installation section of the seal member 247, as shown in FIG. 11, a minute gap S is formed between the spigot section 207C and the large diameter opening section in the body section 205C of the front housing 205. Specifically, in an area on the mouth side of the installation section of the seal member 247, the outer diameter of the spigot section 207 is smaller than the inner diameter of the opening section of the front housing 205, and the minute gap S is thereby formed between the spigot section 207 and the opening section of the housing 205. Since the minute gap S is extremely small in size, only the place where the minute gap S is formed is denoted in FIG. 11 by reference symbol S. In a state where this spigot section 207C has been fitted to the opening of the body section 205C in the front housing 205, the housing 205 and 207 are both joined via the seal member 247 to air tightly seal off the interior of the housing from the atmospheric air, by fastening and fixing the flanges 205A and 207A of the both housings 205 and 207 to each other by the bolts 209.

Moreover, as shown in FIG. 11, the spigot section 225L of the stationary scroll member 225 is fitted with the fitting section 207D of the rear housing 7. In a state where the above seal member 239 is placed in a corner section formed between this fitting section 207D and the spigot section 225L, the stationary scroll member 225 is fastened and fixed on the inner surface of the rear housing 207 by the bolts 231 via a screw boss section 225N formed in a ring shape on the end surface of the stationary scroll member 225. The corner section here in the spigot section 207C refers to an intersection section of an outer circumferential surface and a wall surface that stands up to the outer circumference side from this outer circumferential surface, while the corner section in the fitting section 207D refers to an intersection section of an inner circumferential surface and a wall surface that stands up towards the outer circumference side from this inner circumferential surface. Then, as a result of employing such construction, since a high pressure load is not applied to an end plate outermost circumference portion 225M on the outer circumference side of the spigot section 225L of the end plate 225A, the thickness of the end plate outermost circumference portion 225M is made substantially less than or equal to half of the thickness of other portions of the end plate around the entire circumference.

According to the construction described above, the rear housing 207 and the stationary scroll member 225 are fixed and installed in the state where the stationary scroll member 225 is positioned with respect to the rear housing 207 by fitting the fitting section 207D with the spigot section 225L, regardless of the placement of the seal member 239. Moreover, in the above fitting sections, the interior of the housing 203 is separated into the high pressure discharge chamber 241 and the low pressure intake chamber 243 and they are sealed off from each other by the seal member 239 placed in the corner section formed between the fitting section 207D and the spigot section 225L as described above. Furthermore, on the outer circumference side of the seal member 239 that separates the discharge chamber 241 and the intake chamber 243 from each other, as described above, the seal member 247 placed between one end opening of the body section 205 in the front housing 205 and the spigot section 207C of the rear housing 207 air tightly separates, the intake chamber, that is, the interior of the housing 203, from the atmospheric air.

Next, the operation of the scroll compressor according to the present embodiment is described.

When a rotation driving force is transmitted from an external driving force source via a pulley and electromagnetic clutch (not shown in the diagram) to the crankshaft 211 to rotate the crankshaft 211, the orbiting scroll member 227 connected to the eccentric pin 211C of the crankshaft 211 via the drive bush 219 and the drive bearing 221 is orbitally driven around the stationary scroll member 225 while being prevented from rotating by the rotation prevention mechanism 233.

Refrigeration gas in the intake chamber 243 is sucked into the compression chamber 229 formed on the outermost side in the radial direction by this orbital driving of the orbiting scroll member 227. After intake of the compression chamber 229 has been closed at a predetermined rotational angle, the compression chamber 29 shifts towards the center side as its capacity in the circumferential direction and in the wrap height direction is reduced. The refrigeration gas is compressed during this time, and when it has reached the position where the compression chamber communicates with the discharge port 225K, the discharge reed valve 237 is pushed open, and the compressed gas is discharged into the discharge chamber 241. This compressed refrigeration gas is discharged to outside the compressor through the discharge chamber 241.

The pressure force of the high pressure compressed gas discharged into the discharge chamber 241 is loaded onto the end plate 225A of the stationary scroll member 225 and the rear housing 207 that constitute the discharge chamber 241 on the inner circumference side of the seal member 239 that separates the discharge chamber 241. The seal member 239 is placed between the end surface of the end plate 225A and the inner surface of the rear housing 207 in a position on the inner circumference side of the outer circumferential surface of the end plate 225A. Thus, an area on the end plate 225A and the rear housing 207 on which excessive pressure load is applied can be reduced by the amount to which the seal member 239 is positioned on the inner circumference side of the end plate 225A. As a result, pressure deformation due to excessive pressure load on the end plate 225A and the rear housing 207 can be made very small.

Moreover, an excessive pressure load is no longer applied on the end plate outermost circumference portion 225M, which has a thinner end plate thickness on the outer circumference side of the spigot section 225L of the end plate 225A on which the seal member 239 is installed. As a result, even if the thickness of the end plate outermost circumference portion 225M is made thinner than the other portions, there is no possibility of pressure deformation due to high pressure, and compression performance is not affected.

Moreover, even if a failure occurs in the seal member 239, or a minute deformation occurs in the end plate 225A or the rear housing 207 due to an unusual rise in high pressure resulting in leakage of high pressure compressed gas, the discharge chamber 241 does not come into direct contact with the atmospheric air, and the compressed gas is leaked into the intake chamber 243 formed on the outer circumference side of the discharge chamber 241. Therefore, direct leakage of the compressed gas from the discharge chamber 241 into atmospheric air can be avoided.

As a result, according to the present embodiment, the following effects can be attained.

Since the seal member 239 that separates the discharge chamber 241 is placed in the position on the inner circumference side of the outer circumferential surface of the end plate 225A of the stationary scroll member 225, the area of the surface on the end plate 225A and the rear housing 207 on which pressure load due to high pressure is loaded can be reduced. Accordingly, stress on the end plate 225A, the rear housing 207, and the bolts 231 can be slightly reduced. Therefore, the thickness of these parts can be reduced, and a reduction in weight and production cost of the scroll compressor 201 can thereby be achieved.

Moreover, since the intake chamber 243 is formed on the outer circumference side of the seal member 239 that separates the discharge chamber 241, even if gas leaks from the discharge chamber 241, direct leakage of the gas into atmospheric air can be prevented. Furthermore, in the case of an unusual rise in pressure, damage to the compressor due to the unusual rise in pressure can be prevented before it occurs by leaking compressed gas from the discharge chamber 241 into the intake chamber 243. Incidentally, even if high pressure gas has leaked from the discharge chamber 241 into the intake chamber 243, this does not cause a problem in particular.

Moreover, since the seal member 247 that seals off the intake chamber 243 from the atmospheric air is placed on the outer circumference side of the seal member 239, the seal member 247 need only be able to seal a portion where there is a low pressure difference between low pressure and the atmospheric air, and a seal member that is somewhat less functional and of lower cost compared to the seal member 239 may be employed. Furthermore, since the front housing 205 and the rear housing 207 can be fastened and fixed in the portion where the pressure difference is small, the bolts 209 and the flanges 205A and 207A for fastening can be made small. Therefore, this also contributes to achieving a reduction in weight and production cost.

Moreover, since the spigot section 207C provided in the rear housing 207 is fitted into the opening section of the body section 205C of the front housing 205 to join the both housings 205 and 207, pressure deformation of the rear housing 207 in the opening direction can be suppressed by the front housing 205. Therefore, minute pressure deformation in the rear housing 207 can be further suppressed, and gas leakage due to pressure deformation can be minimized to a greater extent. Furthermore, since the seal member 247 is placed in the spigot section 207C, the seal member 247 shifts in the axial direction with respect to pressure deformation in the opening direction of the rear housing 207. Therefore, the sealing property is not compromised and a seal can be reliably secured. This also contributes to the prevention of gas leakage. Furthermore, since the seal member 247 is installed on the spigot section 207C side, it becomes easier to hold the seal member 247, and since the minute gap S is formed between the spigot section 207C and the opening of the front housing 205, a difference between the outer diameter of the spigot section 207C and the inner diameter of the seal member 247 on the mouth side of the installation section of the seal member 247 of the spigot section 207C is smaller, and installation of the seal member 247 in the spigot section 207C becomes easier as a result. Moreover, on the mouth side of the installation section of the seal member of the spigot section 207C, a clearance for allowing relative movement between the spigot section 207C and the front housing 205 is secured between the spigot section 207C and the opening section of the front housing 205, and fitting the spigot section 207C to the opening section of the front housing 205 can be carried out more easily. Therefore, assembly of the scroll compressor can be made easier.

Moreover, since the stationary scroll member 225 is fixed and installed by fitting the spigot section 225L of the stationary scroll member 225 with the fitting section 207D of the rear housing 207 and placing the seal member 239 on the outer circumference side of the stationary scroll member 225, it can be accurately positioned with respect to the rear housing during assembly regardless of the mounting of the seal member 239.

Moreover, since the seal member 239 is placed in the corner section between the spigot section 225L and the fitting section 207D, processing a seal groove for installing the seal member 239 is not required, and processing cost can be reduced as a result.

Furthermore, since excessive load due to high pressure is no longer loaded on the outermost circumference portion 225M of the end plate 225A in the stationary scroll member 225, the thickness of the end plate outermost circumference portion 225M can be made thinner than that of other portions. Therefore, the weight of the stationary scroll member 225 can be reduced, leading to a reduction in the weight of the scroll compressor 201. In particular, since the above portion 225M is an outermost circumference section of the end plate 225A, by making the plate thickness thinner around the entire circumference, the volume of material can be reduced by an amount that corresponds to that area. Therefore, a reasonable reduction in weight and volume of material to be used can be achieved, and a reduction in the weight and cost of the scroll compressor can be expected.

Moreover, in the present embodiment, the scroll compression mechanism 223 is of a construction in which the height of the spiral wrap on the outer circumference side of the spiral wraps 225B and 227B is higher than that on the inner circumference side, so that three dimensional compression allowing compression in the circumferential direction and in the wrap height direction can be achieved. As a result, in the scroll compressor according to the present embodiment, capacity can be increased without increasing the outer diameter of the scroll. This also contributes to achieving a reduction in size and weight of the scroll compressor.

Fourth Embodiment

Figure 12:
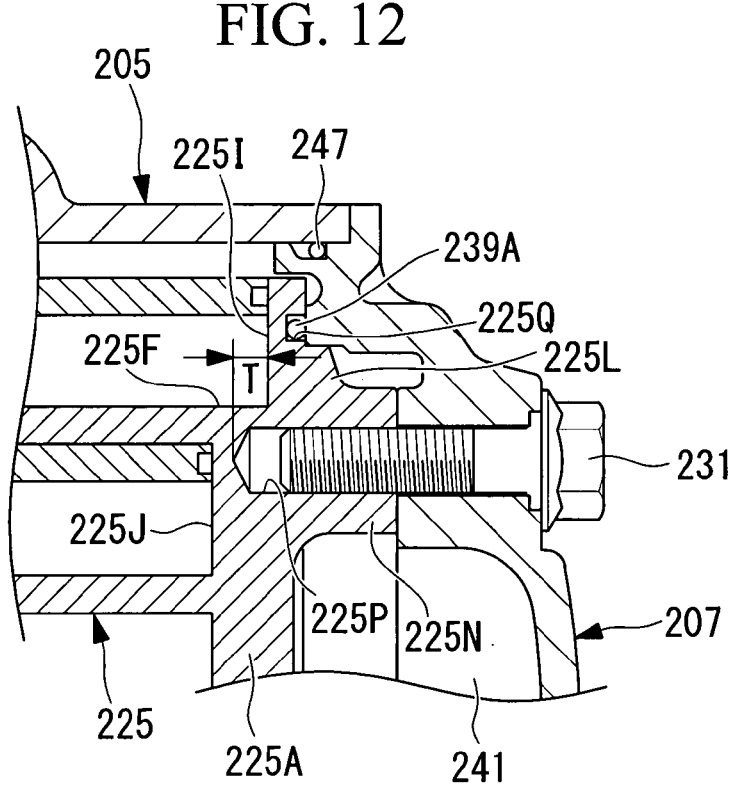
FIG. 12 is a partial enlargement of a sectional view showing a scroll compressor according to a fourth embodiment of the present invention.

Next, a fourth embodiment of the present invention is described, with reference to FIG. 12.

The present embodiment is characterized by a fixed-installation structure of the stationary scroll member 225 with respect to the rear housing 207. Other characteristics of the present embodiment are similar to those of the third embodiment, and descriptions thereof are therefore omitted.

FIG. 12 is a sectional view showing a portion in which a stationary scroll member 225 is fastened and fixed on a rear housing 207 by bolts 231.

In the present embodiment, on the back surface side of an end plate 225A of the stationary scroll member 225, a screw boss section 225N is provided in a position that is on the inner circumference side of a step section 225F provided on a bottom surface 225D, and that is also on the inner circumference side of the spigot section 225L on which the seal member 239A that separates the discharge chamber 241 is installed. The screw boss section 225N is provided in a ring shape so as to project from the end surface of the end plate along the axis L direction towards the side opposite to the spiral wrap 225B (right side in FIG. 12).

Screw holes 225P for the fastening bolts 231 are made in this screw boss section 225N in three to four places at appropriate intervals in the circumferential direction. The screw holes 225P are provided in the screw boss section 225N so as to extend by a length T with respect to a bottom surface 227I on the outer circumference side of the step section 225F towards the wrap side in the axial direction. That is to say, taking advantage of the bottom surface 227J on the inner circumference side of the step section 225F being higher than the bottom surface 227I on the outer circumference side in the axial direction L, the screw hole 225P, the length of which is required to be at least 1.5 times the screw diameter, is provided in this part so as to extend by the above length T.

In the present embodiment, instead of the seal member 239 installed in the corner section of the spigot section 225L in the third embodiment, a seal groove 225Q is provided on the end surface on the outer circumference side of the spigot section 225L of the end plate 225A, and a seal member 239A such as an O-ring is installed therein.

This seal member 239A may be provided on the end surface on the outer circumference side of the screw hole 225P in the screw boss section 225N. As a result, the area of the part on which pressure load due to high pressure is applied can be made still smaller.

According to the present embodiment, the following effects can be attained by the construction described above.

In the present embodiment, the screw boss section 225N is formed in a part where the thickness of the end plate 225A is made thick by providing the step section 225F, and making use of the thickness of the screw boss section 225N, the screw hole 225P for the bolt 231, the engagement depth of which needs to be at least 1.5 times the screw diameter, is provided in this screw boss section 225N. As a result, the length of the screw boss section 225N in the axis L direction does not have to be particularly increased for providing the screw holes 225P of the required dimensions. Accordingly, the length of the scroll compressor 201 in the axial direction L, the minimum dimension being restricted to the length of the first bolts 231 can be shortened. Therefore, in the present embodiment, a reduction in size and weight of the scroll compressor 201 can be realized, improving the mountability of the scroll compressor 201.

In the present embodiment, in particular, the screw hole 225P is provided so as to extend, by the length T, from the bottom surface 225I on the outer circumference side of the step section 225F to the wrap side in the axial direction. Therefore, the length of the scroll compressor 201 in the axial direction, the minimum dimension being restricted to the length of the first bolts 231 can be shortened by at least the length T or greater. As a result, in the present embodiment, an effect of a reduction in size and weight of the scroll compressor 201 can be enhanced to the greatest possible extent.

Moreover, in the present embodiment, the screw boss section 225N is provided on the inner circumference side of the seal member 239A, and the stationary scroll member 225 is fastened and fixed in the position by the bolts 231. As a result, the force loaded on the seal member 239A can be reduced. Therefore, in the present embodiment, the lifetime of the seal member 239A can be extended.

Fifth Embodiment

Figure 13:
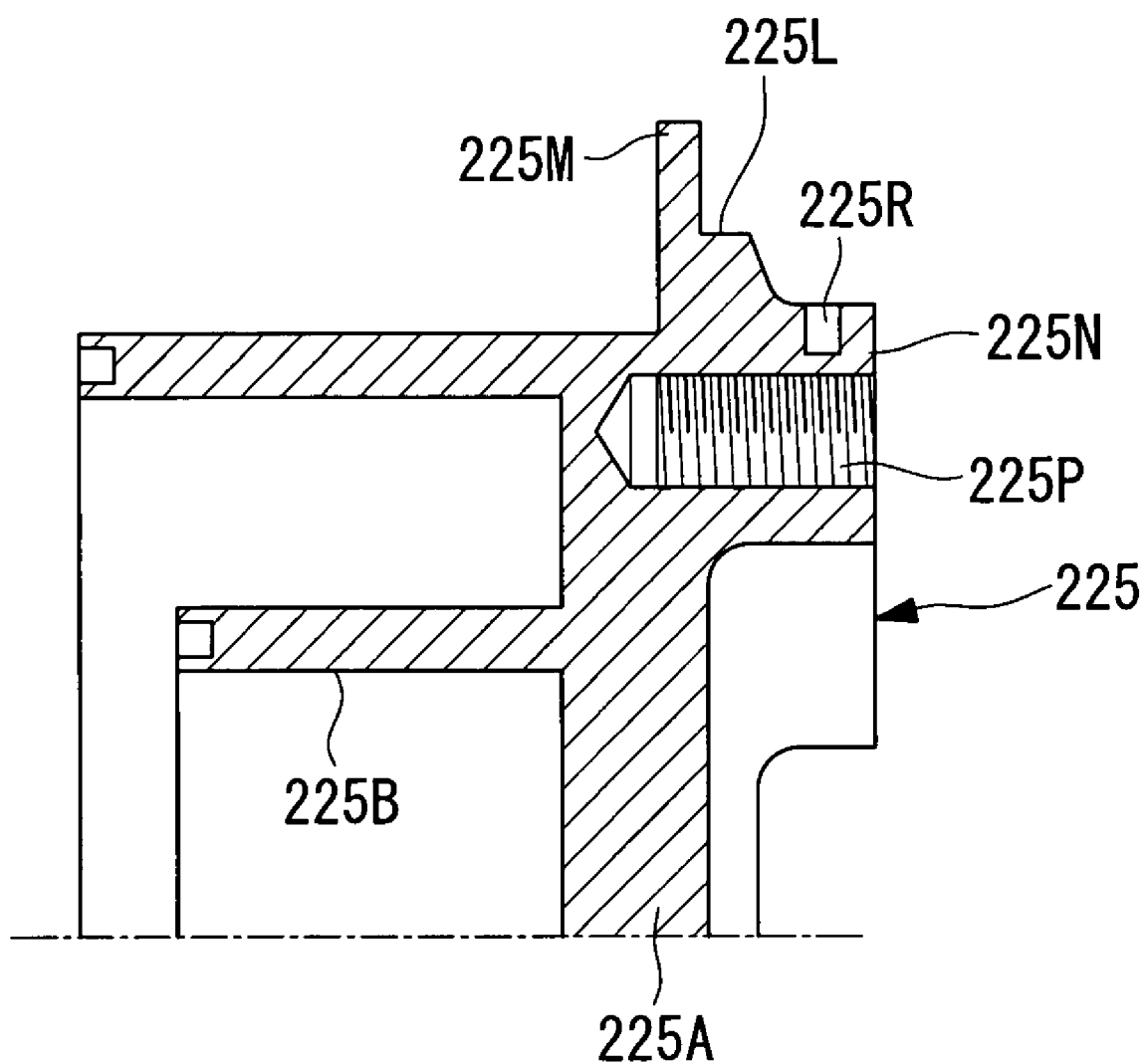
FIG. 13 is a partial enlargement of a sectional view showing a stationary scroll member according to a fifth embodiment of the present invention.

Next, a fifth embodiment of the present invention is described, with reference to FIG. 13.

The present embodiment differs from the third and the fourth embodiments described above in that a clamping groove 225R for use during processing is provided in the stationary scroll member 225. Other characteristics of the present embodiment are similar to those of the third and the fourth embodiments, and descriptions thereof are therefore omitted.

FIG. 13 is a partial sectional view showing one part of the stationary scroll member 225.

In the present embodiment, a groove 225R for clamping the stationary scroll member 225 using a chuck when processing is provided on the outer circumference portion of the screw boss section 225N of the stationary scroll member 225. This groove 225R may be provided in a required range to suit the chuck or it may be provided around the entire circumference of the screw boss section 225N.

The stationary scroll member 225 is generally made by machining a wrap surface of the spiral wrap 225B by end milling. At this time, the outer circumferential surface of the end plate 225A is clamped by a chuck while being processed. However, as described in the aforementioned third and the fourth embodiments, if the thickness of the outermost circumference portion 225M of the end plate 225A in the stationary scroll member 225 is made too thin, then distortion may occur during clamping, and this could affect processing accuracy.

As shown in the present embodiment, the stationary scroll member 225 can be stably fixed when processing by providing the groove 225R for clamping in the screw boss section 225N that is the part in the stationary scroll member 225 where the plate thickness of the end plate 225A is thickest and the rigidity of the end plate 225A is high, and clamping the stationary scroll member 225 in this groove 225R while processing it. Therefore, the stationary scroll member 225 can be processed at a high level of accuracy.

Furthermore, by providing the groove 225R around the entire circumference of the screw boss section 225N, a reduction in weight of the stationary scroll member 225 for the weight corresponding to the volume of this groove 225R can be achieved, and a reduction in the weight of the stationary scroll member can be realized as a result.

In the third, the fourth and fifth embodiments described above, a scroll compressor provided with a compression mechanism capable of performing three dimensional compression, that is, compression in the circumferential direction and in the wrap height direction has been described. However, the present invention is not limited to this, and the invention according to the third and the fifth embodiments may be applied to a normal scroll compressor that is not provided with a step section in the wrap height direction and that can perform compression only in the circumferential direction.

What is claimed is:

1. A scroll compressor, comprising:
   a housing;
   a compression mechanism, said compression mechanism having a stationary scroll fixed and supported in said housing, and an orbiting scroll that is intermeshed with said stationary scroll to form a plurality of compression chambers between the stationary scroll and the orbiting scroll and that revolves;
   and further comprising:
   a crankshaft having a first end side provided with a large diameter shaft section, the large diameter shaft section connecting with an eccentric member for orbiting said orbiting scroll member and being freely rotatably supported on said housing via needle shaped roller bearings having an outer ring, the large diameter shaft section and the outer ring both having an outside facing end portion directed away from the eccentric member and an inside facing end portion directed toward the eccentric member;
   a seal member arranged on a portion of said crankshaft extending from the outside facing portion of the large diameter shaft section, the seal member sealing off an interior of said housing from outside; and
   a crank chamber into which fluid containing lubrication oil is sucked, provided between said orbiting scroll member and said large diameter shaft section, wherein
   the large diameter shaft section has an outer circumferential surface extending in a plane along a direction parallel to a direction of extension of a central axis of the large diameter shaft section extending between the inside facing portion of the large diameter shaft section and the outside facing portion of the large diameter shaft section, the outer circumferential surface having an outside end nearer to the outside facing end portions of the large diameter shaft section and the outer ring than the inside facing end portions thereof and an inside end nearer to the inside facing end portions of the large diameter shaft section and the outer ring than the outside facing end portions thereof, with at least one of the outside end and inside end of the circumferential surface of said large diameter shaft section being spaced from a corresponding outside facing end portion or inside facing end portion of the large diameter shaft section a and spaced from a corresponding outside facing end portion or inside facing end portion of the outer ring.

2. The scroll compressor according to claim 1, wherein both said outside end and said inside end side of the outer circumferential surface of said large diameter shaft section are positioned to be farther from the corresponding outward facing end portion and inward facing end portion of the large diameter shaft section as compared to a corresponding outside facing end portion or inside facing end portion of said outer ring.

3. A scroll compressor, comprising:
   a housing;
   a compression mechanism, said compression mechanism having a stationary scroll fixed and supported in said housing, and an orbiting scroll that is intermeshed with said stationary scroll to form a plurality of compression chambers between the stationary scroll and the orbiting scroll, and that revolves;
   a crankshaft with a large diameter shaft section having an eccentric member for orbiting said orbiting scroll on one end section, said large diameter shaft section being freely rotatably supported on said housing via needle shaped roller bearings having an outer ring;
   a seal member arranged on an other end side of said crankshaft for sealing off the interior of said housing from outside; and
   a crank chamber into which fluid containing lubrication oil is sucked, provided between said orbiting scroll member and said large diameter shaft section, wherein
   a dimension of a circumferential surface of said large diameter shaft section in a direction parallel to an axial direction of the large diameter shaft is made shorter than a dimension of the outer ring of said needle shaped roller bearing in said direction parallel to the axial direction of the large diameter shaft.

4. The scroll compressor according to claim 3, wherein at least one side portion of the large diameter shaft section is cutaway to form said outer circumferential surface with the dimension in the direction parallel to an axial direction of said large diameter shaft section shorter than the dimension of the outer ring of said needle shaped roller bearing in the direction parallel to the axial direction of said large diameter shaft.

5. The scroll compressor according to claim 3, wherein both side portions of the large diameter shaft section are cutaway to form said outer circumferential surface with the dimension in the direction parallel to an axial direction of said large diameter shaft section shorter than the dimension of the outer ring of said needle shaped roller bearing in the direction parallel to the axial direction of said large diameter shaft.

6. A scroll compressor, comprising:
   a housing;
   a compression mechanism, said compression mechanism having a stationary scroll fixed and supported in said housing, and an orbiting scroll that is intermeshed with said stationary scroll to form a plurality of compression chambers between the stationary scroll and the orbiting scroll and that revolves;
   and further comprising:
   a crankshaft having a first end side provided with a large diameter shaft section, the large diameter shaft section connecting with an eccentric member for orbiting said orbiting scroll member and being freely rotatably supported on said housing via needle shaped roller bearings having an outer ring, the large diameter shaft section and the outer ring both having an outside facing end portion directed away from the eccentric member and an inside facing end portion directed toward the eccentric member;
   a seal member arranged on a portion of said crankshaft extending from the outside facing portion of the large diameter shaft section, the seal member sealing off an interior of said housing from outside; and
   a crank chamber into which fluid containing lubrication oil is sucked, provided between said orbiting scroll member and said large diameter shaft section, wherein
   the large diameter shaft section has an outer circumferential surface extending in a plane along a direction parallel to a direction of extension of a central axis of the large diameter shaft section extending between the inside facing portion of the large diameter shaft section and the outside facing portion of the large diameter shaft section, the outer circumferential surface having an outside end nearer to the outside facing end portions of the large diameter shaft section and the outer ring than the inside facing end portions thereof and an inside end nearer to the inside facing end portions of the large diameter shaft section and the outer ring than the outside facing end portions thereof, with at least one of the outside end and inside end of the circumferential surface of said large diameter shaft section being farther from a corresponding outside facing end portion or inside facing end portion of the large diameter shaft section as compared to a corresponding outside facing end portion or inside facing end portion of the outer ring, and wherein at least one of a part of the outside facing end portion and inside facing end portion of the large diameter shaft section is cutaway to define at least one of the inside end and outside end of the outer circumferential surface of said large diameter shaft section.

7. A scroll compressor, comprising:

a housing;

a compression mechanism, said compression mechanism having a stationary scroll fixed and supported in said housing, and an orbiting scroll that is intermeshed with said stationary scroll to form a plurality of compression chambers between the stationary scroll and the orbiting scroll and that revolves;

and further comprising:

a crankshaft having a first end side provided with a large diameter shaft section, the large diameter shaft section connecting with an eccentric member for orbiting said orbiting scroll member and being freely rotatably supported on said housing via needle shaped roller bearings having an outer ring, the large diameter shaft section and the outer ring both having an outside facing end portion directed away from the eccentric member and an inside facing end portion directed toward the eccentric member;

a seal member arranged on a portion of said crankshaft extending from the outside facing portion of the large diameter shaft section, the seal member sealing off an interior of said housing from outside; and a crank chamber into which fluid containing lubrication oil is sucked, provided between said orbiting scroll member and said large diameter shaft section, wherein the large diameter shaft section has an outer circumferential surface extending in a plane along a direction parallel to a direction of extension of a central axis of the large diameter shaft section extending between the inside facing portion of the large diameter shaft section and the outside facing portion of the large diameter shaft section, the outer circumferential surface having an outside end nearer to the outside facing end portions of the large diameter shaft section and the outer ring than the inside facing end portions thereof and an inside end nearer to the inside facing end portions of the large diameter shaft section and the outer ring than the outside facing end portions thereof, with at least one of the outside end and inside end of the circumferential surface of said large diameter shaft section being farther from a corresponding outside facing end portion or inside facing end portion of the large diameter shaft section as compared to a corresponding outside facing end portion or inside facing end portion of the outer ring, and wherein parts of the outside facing end portion and inside facing end portion of the large diameter shaft section are cutaway to define a corresponding inside end and outside end of the outer circumferential surface of said large diameter shaft section.

* * * * *